(12) United States Patent
Daily et al.

(10) Patent No.: US 10,401,575 B2
(45) Date of Patent: Sep. 3, 2019

(54) FERRULE BOOT WITH GUIDE CHANNEL(S) FOR MULTI-FIBER FERRULE AND FABRICATION METHOD USING SAME

(71) Applicant: Corning Optical Communications LLC, Hickory, NC (US)

(72) Inventors: Cristian Michael Daily, Hickory, NC (US); Christopher Paul Lewallen, Hickory, NC (US); Hieu Vinh Tran, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/850,661

(22) Filed: Dec. 21, 2017

(65) Prior Publication Data

US 2018/0210153 A1    Jul. 26, 2018

Related U.S. Application Data

(60) Provisional application No. 62/439,948, filed on Dec. 29, 2016.

(51) Int. Cl.
  *G02B 6/44* (2006.01)
  *G02B 6/38* (2006.01)

(52) U.S. Cl.
  CPC ......... *G02B 6/3883* (2013.01); *G02B 6/3825* (2013.01); *G02B 6/3829* (2013.01); *G02B 6/3839* (2013.01); *G02B 6/3855* (2013.01); *G02B 6/3857* (2013.01); *G02B 6/3861* (2013.01); *G02B 6/4471* (2013.01)

(58) Field of Classification Search
  None
  See application file for complete search history.

(56) References Cited

U.S. PATENT DOCUMENTS

| 4,830,456 A | 5/1989 | Kakii et al. |
| D810,027 S | 2/2018 | De Jong et al. |
| 2002/0076189 A1 | 6/2002 | McMullin et al. |
| 2006/0115218 A1 | 6/2006 | Howard et al. |

(Continued)

FOREIGN PATENT DOCUMENTS

| EP | 0701152 A1 | 3/1996 |
| WO | 2014042799 A1 | 3/2014 |

OTHER PUBLICATIONS

International Search Report and Written Opinion PCT/US2017/067532 dated Apr. 5, 2018.

*Primary Examiner* — Chad H Smith
(74) *Attorney, Agent, or Firm* — Adam R. Weeks

(57) ABSTRACT

A ferrule boot for a fiber optic cable includes a front body portion defining at least one aperture, and includes at least one rear body portion defining at least one guide channel that facilitates insertion of loose optical fiber segments through the at least one aperture. At least a portion of each guide channel lacks a top surface boundary that is registered with a top surface of a corresponding aperture, such that an accessible (e.g., open) top portion is provided to ease insertion of at least one group of optical fibers into the at least one guide channel, with the optical fibers preferably being non-ribbonized. Fiber optic cable assemblies and methods for fabrication utilizing the ferrule boot are further provided.

21 Claims, 15 Drawing Sheets

(56) References Cited

U.S. PATENT DOCUMENTS

| | | | |
|---|---|---|---|
| 2011/0019962 A1* | 1/2011 | Childers | G02B 6/3869 385/76 |
| 2013/0195406 A1 | 8/2013 | Cooke et al. | |
| 2013/0216185 A1 | 8/2013 | Klavuhn et al. | |
| 2014/0185994 A1 | 7/2014 | Huang | |
| 2017/0153397 A1 | 6/2017 | De Jong et al. | |

* cited by examiner

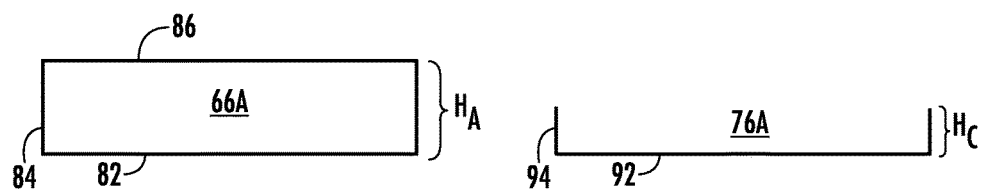
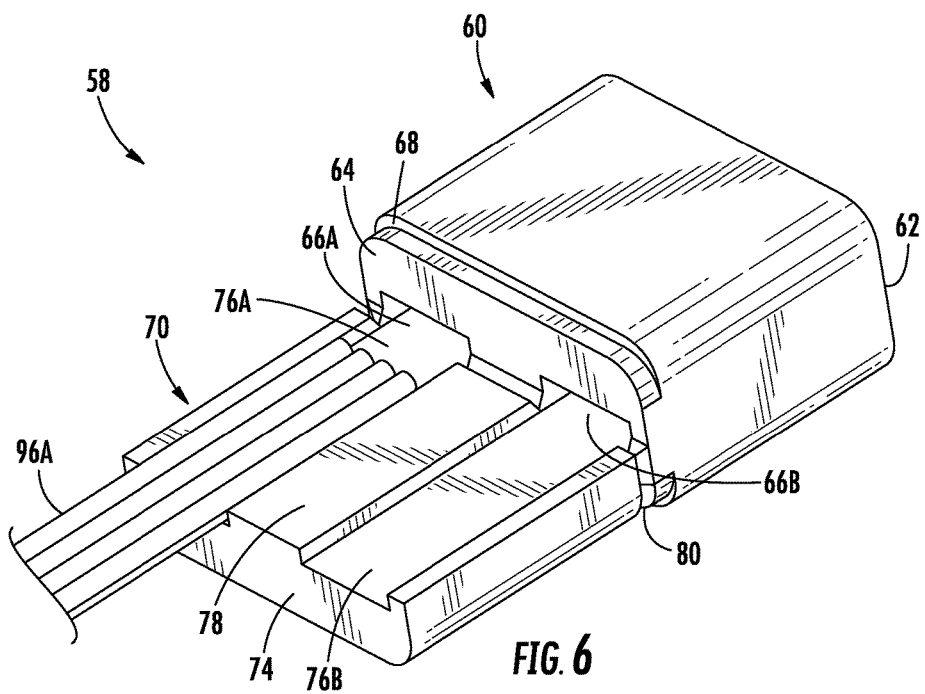

FERRULE BOOT WITH GUIDE CHANNEL(S) FOR MULTI-FIBER FERRULE AND FABRICATION METHOD USING SAME

CROSS-REFERENCE TO RELATED APPLICATION

This application claims the benefit of priority of U.S. Provisional Application Ser. No. 62/439,948, filed on Dec. 29, 2016, the content which is relied upon and incorporated herein by reference in its entirety.

BACKGROUND

This disclosure relates generally to optical fibers, and more particularly to fiber optic cable assemblies incorporating multi-fiber ferrules, and methods for fabricating fiber optic cable assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors ("connectors" or "optical connectors") are often provided on the ends of fiber optic cables. The process of terminating individual optical fibers from a fiber optic cable is referred to as "connectorization." Connectorization can be performed in a factory (resulting in a "pre-connectorized" or "pre-terminated" fiber optic cable) or in the field (e.g., using a "field-installable" connector).

Many different types of fiber optic connectors exist. In environments that require high density interconnects and/or high bandwidth, such as data centers, multi-fiber optical connectors are the most widely used. Multi-fiber optical connectors are suitable for use with multi-fiber cables and frequently utilize multi-fiber ferrules. One example of a multi-fiber optical connector is the multi-fiber push on (MPO) connector, which incorporates a mechanical transfer (MT) ferrule and is standardized according to TIA-604-5 and IEC 61754-7. These connectors can achieve a high density of optical fibers, which reduces the amount of hardware, space, and effort required to establish a large number of interconnects.

Despite the widespread use of MPO connectors in data center environments, there are still challenges and issues to address. For example, although MPO connectors may contain any even number of fibers between 4 and 24 within the same physical package, 12-fiber connectors are the most commonly used. For some applications, such as el optics for 40 Gigabits per second (Gps) Ethernet, only 8 active fibers are needed. Conversion modules may be used to convert the unused fibers from two or more MPO connectors into usable optical links (e.g., converting 4 unused fibers from each of two MPO connectors into 8 useable optical links), but the conversion adds costs to a network. Alternatively, cable assemblies can be built with only 8 fibers terminated by an MPO connector, but the MPO connector still resembles a 12-fiber connector, and it can be difficult to see with the naked eye whether 8 fibers or 12 fibers are present. This uncertainty in fiber count may result in network issues if a connector having 12 active fibers is inadvertently mated to a connector having only 8 active fibers.

Securing groups of fibers during assembly of a MPO connector can be challenging for fabrication steps such as fiber stripping, cleaving, and affixing fibers within a MT style ferrule. Traditional ribbonizing techniques have utilized adhesives to secure fibers together after a portion of a jacket of a multi-fiber cable is stripped. Such techniques, however, are cumbersome, and can be particularly challenging when it is desired to segregate multiple groups of fibers emanating from the same multi-fiber cable for insertion into a MT style ferrule. For example, it is very difficult to hold separate ribbons and insert them through aperture-defining ferrule boots as well as micro-holes of MT style ferrules. But as difficult as it may be to manipulate two ribbons at the same time, it is even more difficult to manipulate four, eight, twelve or more loose (e.g., non-ribbonized) fibers at the same time.

Thus, the art continues to seek fiber optic cable assembly components and fabrication methods that address limitations associated with conventional assemblies and methods, including cable assembly components and methods that facilitate handling of optical fiber segments without requiring use of ribbonizing techniques.

SUMMARY

Aspects of the present disclosure provide a ferrule boot with one or more guide channels for use with a multi-fiber ferrule, and related methods for fabricating a fiber optic cable assembly using such a ferrule boot. A ferrule boot includes a front body portion defining at least one aperture, and includes at least one rear body portion defining at least one guide channel. The at least one guide channel facilitates insertion of loose optical fiber segments through the at least one aperture. Each guide channel is bounded by a bottom wall and side walls that are substantially registered with a bottom wall and side walls, respectively, of a corresponding aperture. At least a portion of each guide channel lacks a top surface boundary that is registered with a top surface of a corresponding aperture, such that an accessible (e.g., open) top portion is provided to ease insertion of at least one group of optical fibers into the at least one guide channel, with the optical fibers preferably being non-ribbonized. For example, a guide channel according to certain embodiments may be configured as a ledge that is devoid of a top surface boundary, or a rear body portion may include a rear end face that is angled away from vertical (e.g., in a range of from about 20 degrees to about 70 degrees relative to a longitudinal axis) to define a portion of a guide channel that is devoid of a top surface boundary. Optionally, multiple guide channels and multiple apertures may be provided, with each being configured to receive a different group of loose optical fibers. The ferrule boot is configured for use with a multi-fiber ferrule of a fiber optic connector.

In an exemplary aspect, a ferrule boot for use in fabricating a fiber optic assembly includes a front body portion and a rear body portion that extends rearward from the front body portion and defines at least one guide channel. At least one aperture is defined through the front body portion, with each aperture of the at least one aperture being bounded by a bottom surface, a top surface, and side surfaces extending through the front body portion. The at least one guide channel extends rearwardly from the at least one aperture. Each guide channel of the at least one guide channel is bounded by side surfaces and a bottom surface that are respectively registered with side surfaces and the bottom surface of a corresponding aperture of the at least one aperture. Each guide channel and each aperture is configured to receive multiple optical fibers. At least a portion of each guide channel is devoid of a top surface boundary that is registered with a top surface of a corresponding aperture of the at least one aperture. The open top portion is provided to ease insertion of at least one group of optical fibers into the at least one guide channel.

In another exemplary aspect, a method for fabricating a fiber optic cable assembly includes assembling a plurality of loose optical fiber segments emanating from a fiber optic cable into at least one group (optionally, multiple groups) of loose optical fibers. The at least one group of loose optical fibers is received into at least one guide channel (optionally, multiple guide channels) defined by a rear body portion of a ferrule boot. Each guide channel of the at least one guide channel is bounded by side surfaces and a bottom surface. Thereafter, the at least one group of loose optical fibers received by the at least one guide channel is inserted into and through at least one aperture (optionally, multiple apertures) defined through a front body portion of the ferrule boot. Each aperture of the at least one aperture is bounded by a bottom surface, a top surface, and side surfaces extending through the front body portion. At least a portion of each guide channel is devoid of a top surface boundary that is registered with a top surface of a corresponding aperture. The at least one group of loose optical fibers is non-ribbonized when extending through the at least one guide channel and the at least one aperture.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5A is a front elevation schematic view of an aperture defined in the front body portion of the ferrule boot of FIG. 3;

FIG. 5B is a rear elevation schematic view of a guide channel defined in the rear body portion of the ferrule boot of FIG. 3;

FIG. 6 is a perspective view of the ferrule boot of FIGS. 3 and 4 with a first group of loose optical fibers received within a first guide channel of the rear body portion of the ferrule boot;

DETAILED DESCRIPTION

Figure 1:
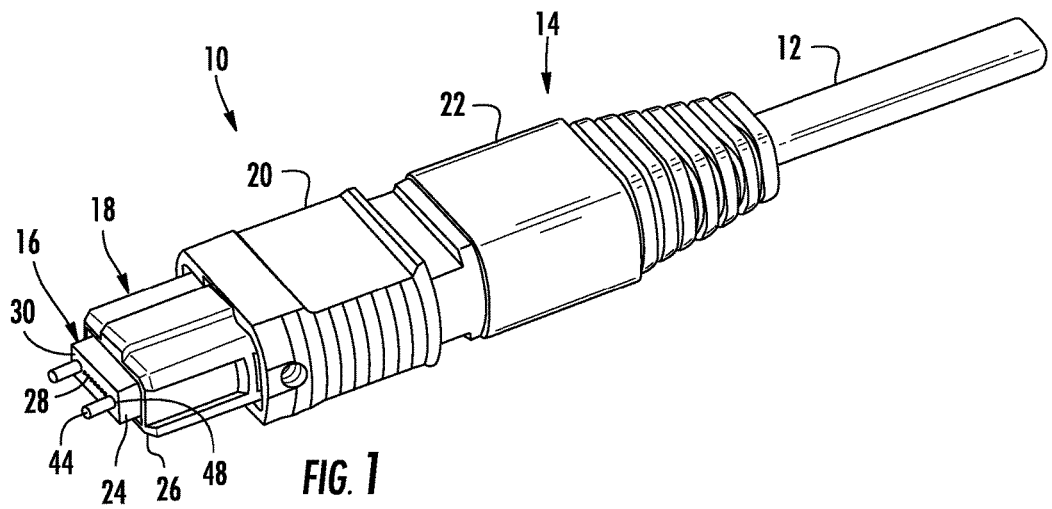
FIG. 1 is a perspective view of a fiber optic connector and an associated fiber optic cable forming a fiber optic cable assembly, with the fiber optic connector including a multi-fiber ferrule with a single ferrule boot to serve as a comparison structure for subsequently described embodiments.

Various embodiments will be further clarified by examples in the description below. In general, the description relates to a ferrule boot with one or more guide channels for use with a multi-fiber ferrule, and related methods for fabricating a fiber optic cable assembly using such a ferrule boot. Such a ferrule boot includes at least one guide channel that facilitates insertion of loose optical fiber segments through at least one corresponding aperture defined in the ferrule boot. The ferrule boot is configured for use with a multi-fiber ferrule of a fiber optic connector. One example of a fiber optic connector 10 (also referred to as "optical connector 10", or simply "connector 10") is shown in FIG. 1, with an exploded view of the connector being provided in FIG. 2. The connector 10 is shown in the form of an MTP® connector, which is a particular type of MPO connector (MTP® is a trademark of US Conec Ltd.).

Figure 2:
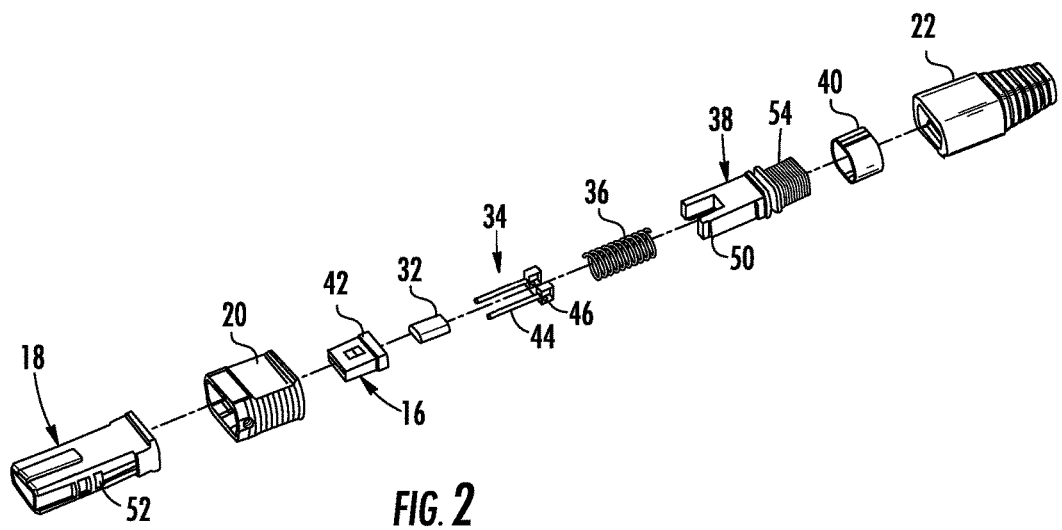
FIG. 2 is an exploded perspective view of the fiber optic cable assembly of FIG. 1.

Before discussing ferrule boot embodiments and fabrication methods utilizing one or more guide channels for use with a multi-fiber ferrule, a brief overview of the connector 10 shown in FIGS. 1 and 2 will be provided to facilitate discussion, as the multi-fiber ferrules and other components shown in subsequent figures may be used with the same type of connector as the connector 10. However, persons skilled in the field of optical connectivity will appreciate that the connector 10 is merely an example, and that the general principles disclosed with respect to the multi-fiber ferrules and other components shown in subsequent figures may also be applicable to other connector designs.

As shown in FIG. 1, the connector 10 may be installed on a fiber optic cable 12 ("cable") to form a fiber optic cable assembly 14. The connector 10 includes a ferrule 16, a housing 18 received over the ferrule 16, a slider 20 received over the housing 18, and a boot 22 received over the cable 12. The ferrule 16 is spring-biased within the housing 18 so that a front portion 24 of the ferrule 16 extends beyond a front end 26 of the housing 18. Optical fibers (not shown) carried by the cable 12 extend through bores 28 (also referred to as micro-holes) defined in the ferrule 16 before terminating at or near a front end face 30 of the ferrule 16.

The optical fibers are secured within the ferrule 16 using an adhesive material (e.g., epoxy) and can be presented for optical coupling with optical fibers of a mating component (e.g., another fiber optic connector; not shown) when the housing 18 is inserted into an adapter, receptacle, or the like.

As shown in FIG. 2, the connector 10 also includes a ferrule boot 32, guide pin assembly 34, spring 36, crimp body 38, and crimp ring 40. The ferrule boot 32, which is symmetrical and substantially rectangular in shape along each surface thereof, is received in a rear portion 42 of the ferrule 16 to help support the optical fibers extending to the micro-holes or bores 28 (shown in FIG. 1). In particular, optical fibers extend through an aperture (not shown) defined through the ferrule boot 32. The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (shown in FIG. 1) provided in the ferrule 16 so as to project beyond the front end face 30 of the ferrule 16.

Both the ferrule 16 and guide pin assembly 34 are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled and includes latching arms 50 that engage recesses 52 in the housing 18. The spring 36 is compressed by this point and exerts a biasing force on the ferrule 16 via the pin keeper 46. The rear portion 42 of the ferrule 16 defines a flange that interacts with a shoulder or stop formed within the housing 18 to retain the rear portion 42 of the ferrule 16 within the housing 18. The rear portion 42 of the ferrule 16 also includes a cavity (not shown) configured to receive at least a front portion of the ferrule boot 32.

In a manner not shown in the figures, aramid yarn or other strength members from the cable 12 are positioned over an end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for optical fibers emanating from the fiber optic cable 12 by limiting the extent to which the connector 10 can bend relative to the fiber optic cable 12.

Now that a general overview of the connector 10 has been provided, alternative ferrule designs will be described. Although the ferrule 16 includes a surface embodying a flat front end face 30, in certain embodiments, one or more portions of the front end face 30 may protrude forwardly from such a surface to form one or more pedestals through which multiple bores (such as bores 28 shown in FIG. 1) extend. Similarly, although the front end face 30 of the ferrule 16 shown in FIG. 1 includes multiple bores 28 that are equally spaced to form a one-dimensional array, in certain embodiments, multiple groups of bores may extend through a front end face with one or more solid regions free of bores provided between such groups of bores. For example, a ferrule configured for parallel optics applications for 40 Gps transmission may include first and second groups of four micro-holes or bores that are spaced apart (e.g., by a distance equal to four bores) and that each receive a different group of four optical fibers, with a solid region free of bores provided between the groups of bores along a front end face of the ferrule. A ferrule having such a configuration would be particular suited for parallel optics applications for 40 Gps transmission (relative to a ferrule including twelve bores in which only the first four and the last bores include terminated optical fibers) in that there would be no unused optical fibers or empty bores.

As noted previously, the ferrule boot 32 shown in FIG. 2 is symmetric, is substantially rectangular in shape along each surface thereof, and defines an aperture that extends therethrough. In contrast to the ferrule boot 32, embodiments of the present disclosure include a ferrule boot in which a front body portion defines at least one aperture, and in which a rear body portion defines at least one guide channel that facilitates insertion of loose optical fiber segments through the at least one aperture. In particular, at least a portion of each guide channel of the at least one guide channel lacks a top surface boundary that is registered with a top surface of a corresponding aperture of the at least one aperture, such that at least a portion of each guide channel is accessible from above to ease insertion of at least one group of optical fibers. Each guide channel serves to guide a group of optical fibers to a corresponding aperture for passage through the ferrule boot. A ferrule boot may include one or more apertures each configured to retain multiple loose optical fibers, and a corresponding number of one or more channels are also provided. Although apertures of any suitable shape may be provided, in certain embodiments, each aperture includes a rectangular shape configured to receive a one dimensional array of optical fibers, with the rectangular shape including a height slightly exceeding the diameter of a single optical fiber, and including a width slightly exceeding a multiple (e.g., two, three, four, six, eight, etc.) of the diameter of a single optical fiber. When multiple apertures are provided, at least one boundary (e.g., a lateral and/or a vertical boundary) is provided between the respective apertures to ensure that the apertures are discontinuous in character. Similarly, when multiple channels are provided, at least one boundary (e.g., a lateral boundary) is provided therebetween to ensure that the channels are discontinuous in character. If provided, multiple apertures of each ferrule boot may be laterally offset and/or vertically offset relative to one another, and multiple channels may be offset in the same manner. Each ferrule boot may include any suitable number of apertures and channels, such as one, two, three, four, or more, with corresponding numbers of grouped optical fibers. In certain embodiments, a ferrule boot may comprise an elastomeric or other polymeric material, and may be formed by molding or other appropriate fabrication methods.

Figure 3:
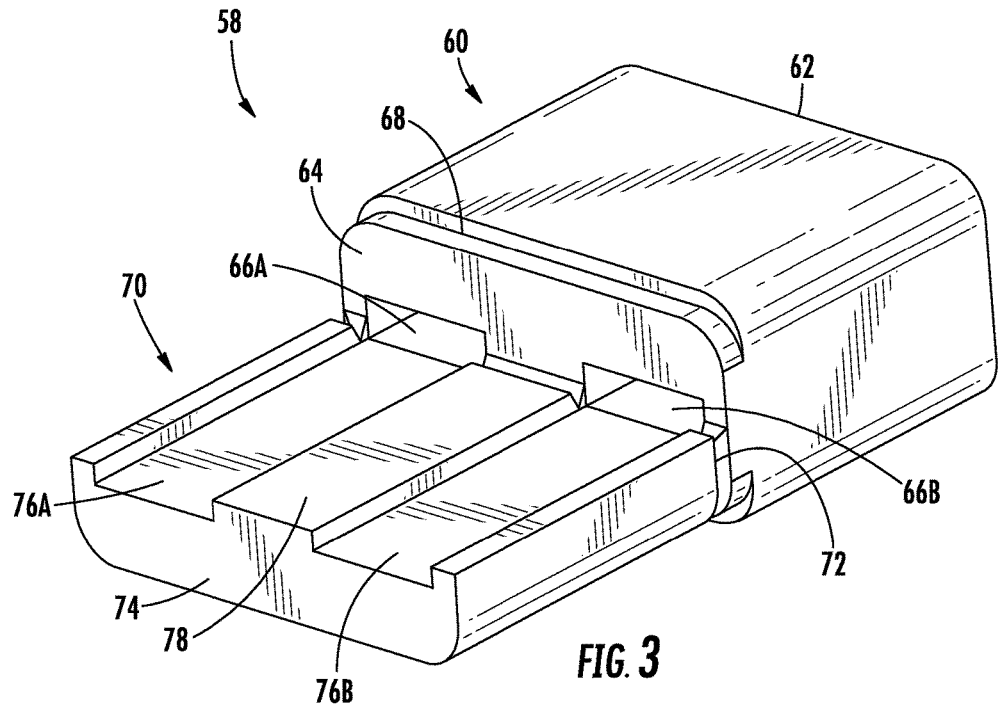
FIG. 3 is a perspective view of an exemplary ferrule boot including a front body portion defining multiple apertures and a rear body portion embodied in a removable guide ledge defining multiple guide channels registered with the apertures along bottom and side surfaces thereof.

An exemplary ferrule boot 58 including a front body portion 60 defining multiple apertures 66A, 66B and including a rear body portion 70 embodied in a guide ledge defining multiple guide channels 76A, 76B is shown in FIG. 3. The front body portion 60 includes a front end face 62 and a rear end face 64, and includes first and second apertures 66A, 66B extending between the front end face 62 and the rear end face 64. As shown, the first and second apertures 66A, 66B are rectangular in shape, and each includes a width that exceeds a height thereof. Upper and lower shoulder portions 68 including a slightly reduced thickness of the front body portion 60 are arranged proximate to the rear end face 64. The rear body portion 70 includes a front end face 72 and a rear end face 74, and includes first and second guide channels 76A, 76B separated by a medial wall 78 that is longitudinally oriented parallel to a lengthwise direction of the ferrule boot 58. Each guide channel 76A, 76B defined in the rear body portion 70 is registered (i.e., aligned) with a corresponding aperture 66A, 66B defined in the front body portion 60. In particular, a bottom surface and side surfaces of each guide channel 76A, 76B are registered with a bottom surface and side surfaces, respectively, of a corresponding aperture 66A, 66B. Such registration between each guide channel 76A, 76B and a corresponding aperture 66A, 66B permits groups of loose optical fibers (such as shown in FIGS. 6-10) inserted into a guide channel 76A, 76B to be smoothly guided into and through a corresponding aperture 66A, 66B. An entirety of each guide channel 76A, 76B is devoid of any top surface boundary.

Figure 4:
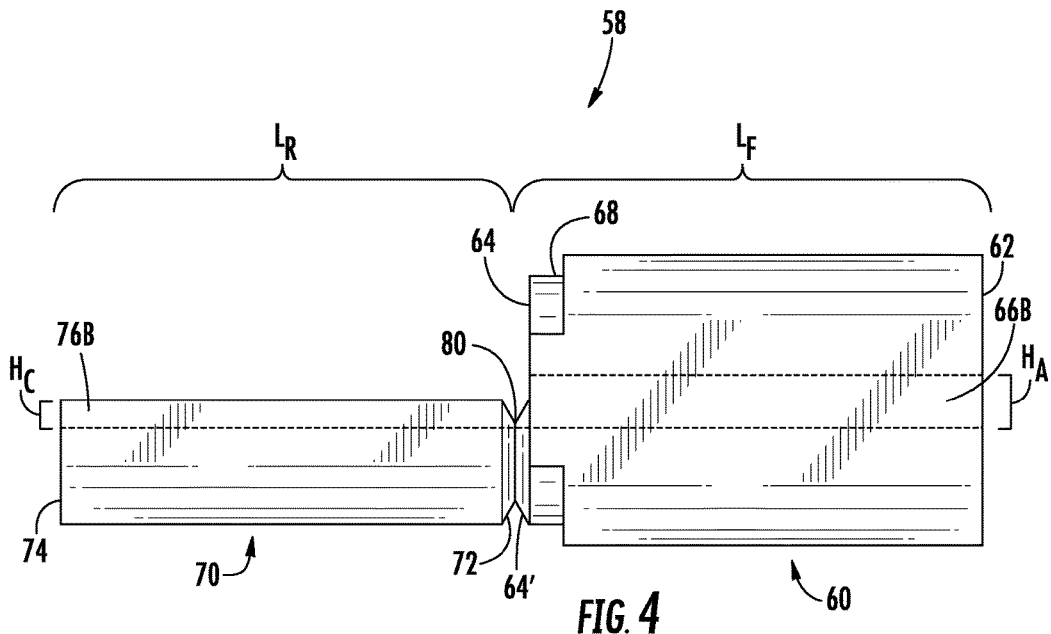
FIG. 4 is a side elevation view of the ferrule boot of FIG. 3, with dashed lines depicting positions of an aperture defined in the front body portion and of a guide channel defined in the rear body portion.

FIG. 4 is a side elevation view of the ferrule boot 58 of FIG. 3, with dashed lines depicting positions of the second aperture 66B (having an aperture height $H_A$) defined in the front body portion 60 and of the second guide channel 76B (having a channel height $H_C$ that is less than $H_A$) defined in the rear body portion 70. The rear body portion 70 is configured to be torn away from the front body portion 60 due to presence of a tear-away feature in the form of an interface 80 having a reduced thickness and a reduced height relative to the remainder of the rear body portion 70. As shown in FIG. 4, the rear end face 64 of the front body portion 60 includes a protruding neck region 64' that is proximate to a comparable protruding neck that embodies the front end face 72 of the rear body portion 70. The front body portion 60 includes a length $L_F$ that is substantially the same as a length $L_R$ of the rear body portion 70. In alternative embodiments, a rear body portion may include a smaller or greater length than a front body portion of a ferrule boot.

FIGS. 5A and 5B provide schematic views of the first aperture 66A defined in the front body portion 60 and of the first guide channel 76A defined in the rear body portion 70, respectively, of the ferrule boot 58 shown in FIGS. 3 and 4. As shown in FIG. 5A, the first aperture 66A is bounded by a bottom surface 82, side surfaces 84 (including an aperture height $H_A$), and a top surface 86. As shown in FIG. 5B, the first guide channel 76A is bounded by a bottom surface 92 and side surfaces 94 (including a channel height $H_C$, wherein $H_C<H_A$), without including any top surface boundary. The lack of a top surface boundary along the guide channel 76A renders the guide channel 76A accessible from above to ease insertion of at least one group of optical fibers into the guide channel 76A. Presence of side surfaces 94 bounding the guide channel 76A serves to retain optical fibers (not shown) within the guide channel 76A when inserted therein for the purpose of guiding the optical fibers toward an aperture (i.e., aperture 66A shown in FIGS. 3 and 5A) registered with the guide channel 76A.

Figure 7:
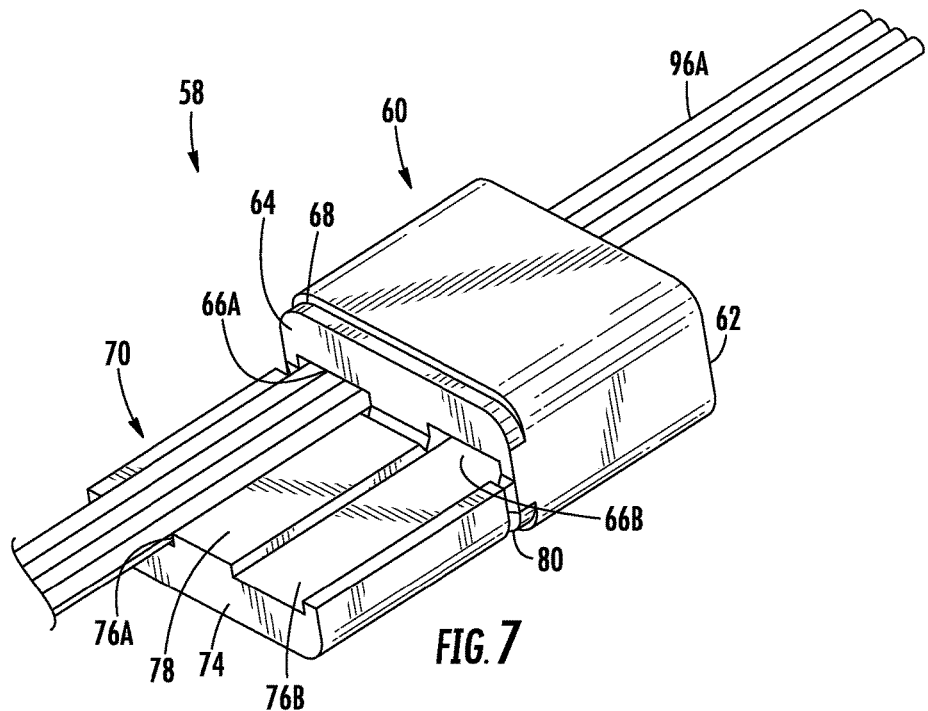
FIG. 7 is a perspective view of the ferrule boot of FIG. 6 following further insertion of the first group of loose optical fibers through the first guide channel and through a first aperture of the front body portion of the ferrule boot.
Figure 8:
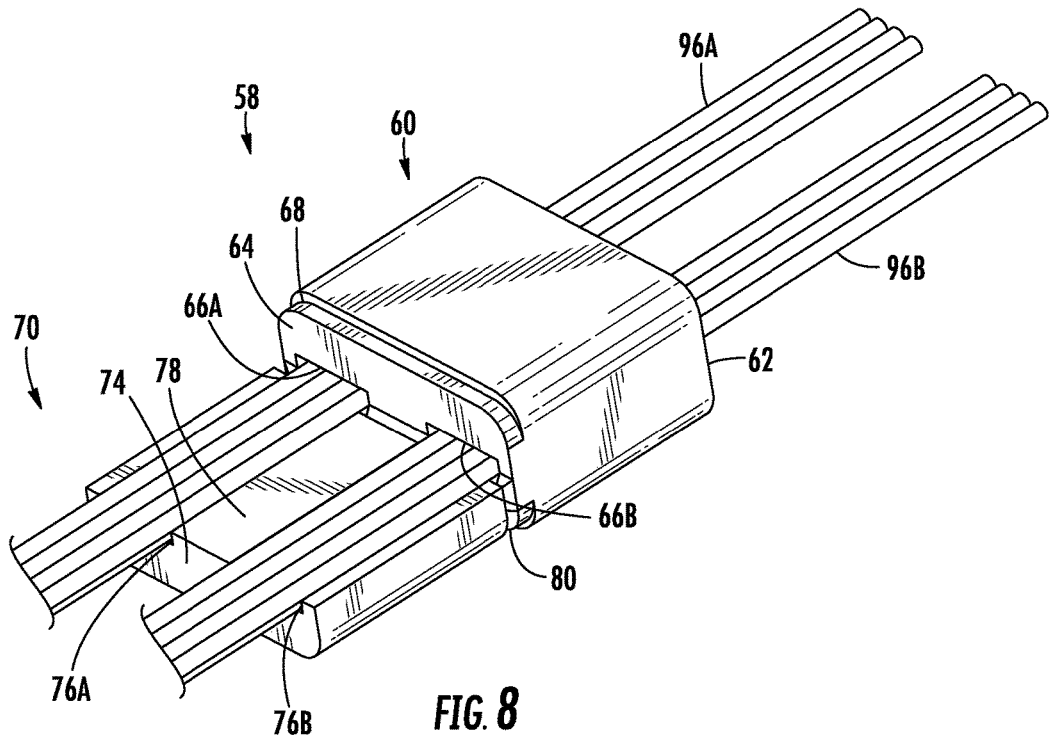
FIG. 8 is a perspective view of the ferrule boot and first group of loose optical fibers of FIG. 7 following insertion of a second group of loose optical fibers through a second guide channel of the rear body portion and through a second aperture of the front body portion of the ferrule boot.

Steps for inserting first and second groups of optical fibers through the ferrule boot 58 of FIGS. 3 and 4 are depicted in FIGS. 6-8. FIG. 6 is a perspective view of the ferrule boot 58 with a first group of loose optical fibers 96A received within the first guide channel 76A of the rear body portion 70, prior to insertion of the first group of loose optical fibers 96A into the first aperture 66A that is registered with the first guide channel 76A. As shown, the second guide channel 76B is registered with the second aperture 66B, but is devoid of any optical fibers. FIG. 7 illustrates the ferrule boot of FIG. 6 following further insertion of the first group of loose optical fibers 96A through the first guide channel 76A and through the first aperture 66A to extend beyond the front end face 62 of the front body portion 60 of the ferrule boot 58. FIG. 8 illustrates the ferrule boot 58 and first group of loose optical fibers 96A of FIG. 7 following insertion of a second group of loose optical fibers 96B through the second guide channel 76B of the rear body portion 70 and through a second aperture 66B of the front body portion 60 of the ferrule boot 58. Segments of the first and second groups of loose optical fibers 96A, 96B within the rear body portion 70 are separated by the medial wall 78. As shown in FIG. 8, the first and second groups of loose optical fibers 96A, 96B extend beyond the front end face 62 of the front body portion 60 of the ferrule boot 58. Such a configuration permits the first and second groups of loose optical fibers 96A, 96B to be inserted through bores defined in a front end face of a ferrule (not shown) when the ferrule boot 58 is inserted into a ferrule. Other elements not specifically described in connection with FIGS. 6-8 were previously described in connection with FIGS. 3 and 4.

Figure 9:
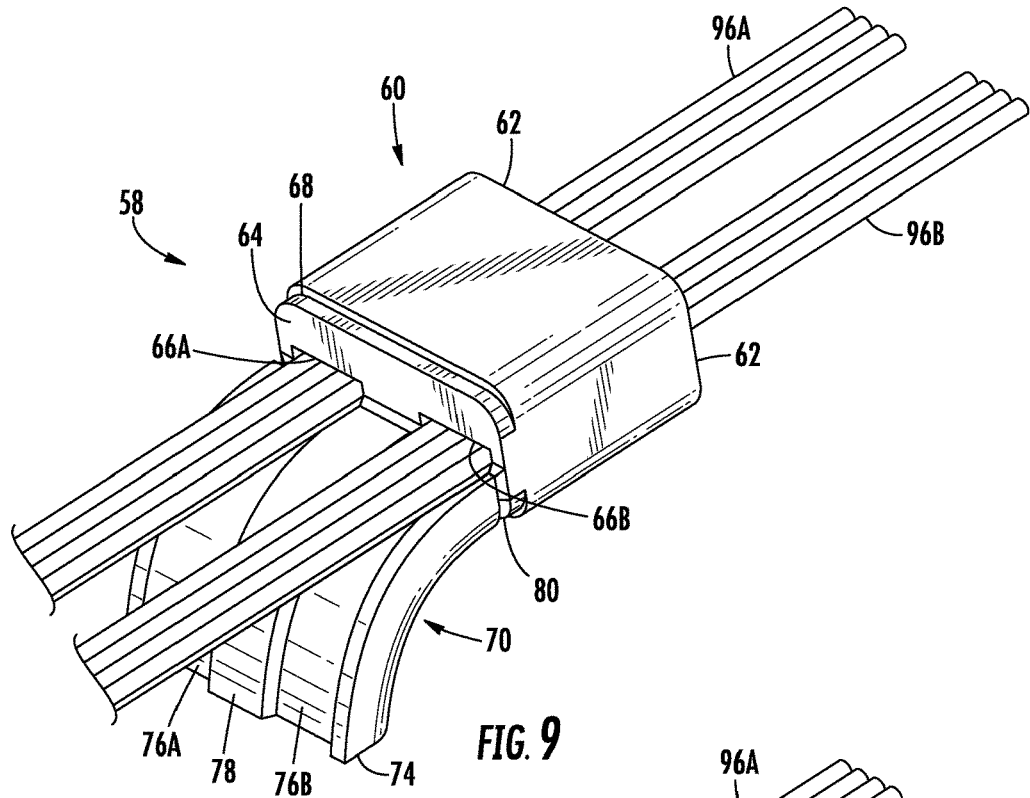
FIG. 9 is a perspective view of the ferrule boot and first and second groups of loose optical fibers of FIG. 8, showing downward deflection of the rear body portion in preparation for removal of the rear body portion from the front body portion.
Figure 10:
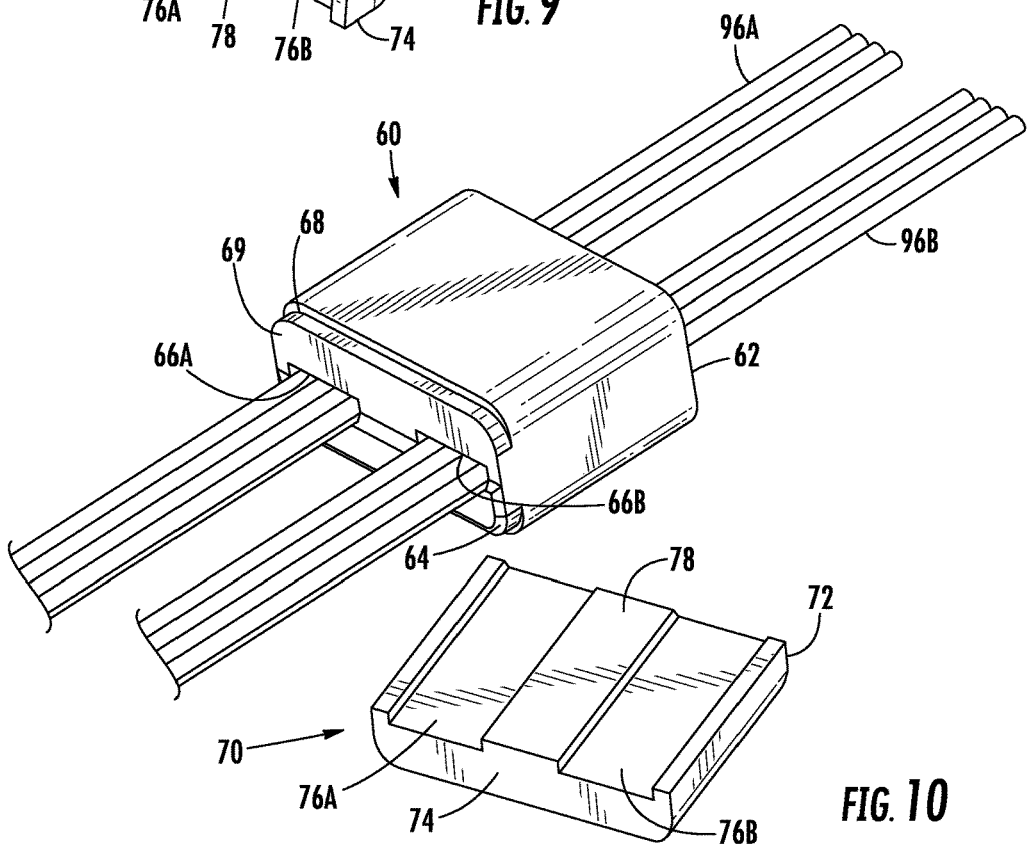
FIG. 10 is a perspective view of the first and second groups of loose optical fibers and a portion of the ferrule boot of FIGS. 8 and 9, and showing the rear body portion separated from the front body portion of the ferrule boot.

FIGS. 9 and 10 illustrate steps in removing the rear body portion 70 from the front body portion 60 of the ferrule boot 58 while the first and second groups of loose optical fibers 96A, 96B extend through the ferrule boot 58. FIG. 9 shows downward deflection of the rear body portion 70 relative to the front body portion 60. Such deflection may be accomplished manually and/or aided by use of a tool (not shown). Presence of a tear-away feature in the form of an interface 80 between the front and rear body portions 60, 70 having a reduced thickness and a reduced height relative to the remainder of the rear body portion 70 facilitates tearing and separation of the rear body portion 70 from the front body portion 60, as shown in FIG. 10. As shown in FIG. 10, removal of the rear body portion 70 from the front body portion 60 may be performed before the front body portion 60 of the ferrule boot 58 is received by a ferrule. Alternatively, the rear body portion 70 may be removed from the front body portion 60 after the front body portion 60 is received by a ferrule.

Figure 11:
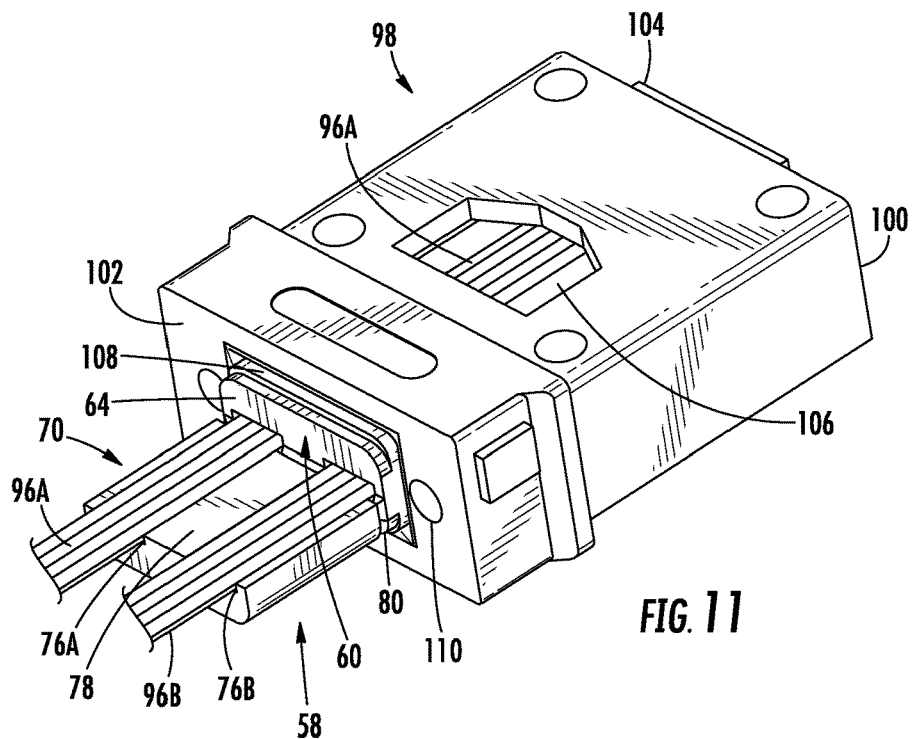
FIG. 11 is a perspective view of the ferrule boot and first and second groups of loose optical fibers of FIG. 8, following reception of the front body portion of the ferrule boot in a cavity defined in a rear end face of a multi-fiber ferrule.

FIG. 11 is a perspective view of the ferrule boot 58 and first and second groups of loose optical fibers 96A, 96B of FIG. 8 following reception of the front body portion 60 of the ferrule boot 58 in a cavity 108 defined in a rear end face 102 of a multi-fiber ferrule 98. The ferrule 98 includes a front end face 100 and the rear end face 102 generally opposing the front end face 100. The cavity 108 defined in the rear end face 102 is configured to receive at least a portion of the front body portion 60 of the ferrule boot 58, wherein an interior of the ferrule 98 defines a passage permitting the first and second groups of loose optical fibers 96A, 96B to be inserted therethrough. A window 106 defined in an upper surface of the ferrule 98 permits the first and second groups of loose optical fibers 96A, 96B to be viewed during insertion thereof through the interior of the ferrule 98. Peripheral portions of the front end face 100 and the rear end face 102 of the ferrule 98 define pin holes 110 arranged to receive guide pins (shown in FIG. 14). A central portion of the front end face 100 projects forward to form a pedestal portion 104 that defines first and second groups of bores (not shown) for receiving first and second groups of optical fibers (e.g., stripped and terminated ends of the first and second groups of loose optical fibers 96A, 96B). As shown in FIG. 11, the rear body portion 70 remains attached to the front body portion 60 of the ferrule boot 58, with the first and second groups of loose optical fibers 96A, 96B present within the guide channels 76A, 76B separated by the medial wall 78 of the rear body portion 70.

Figure 12:
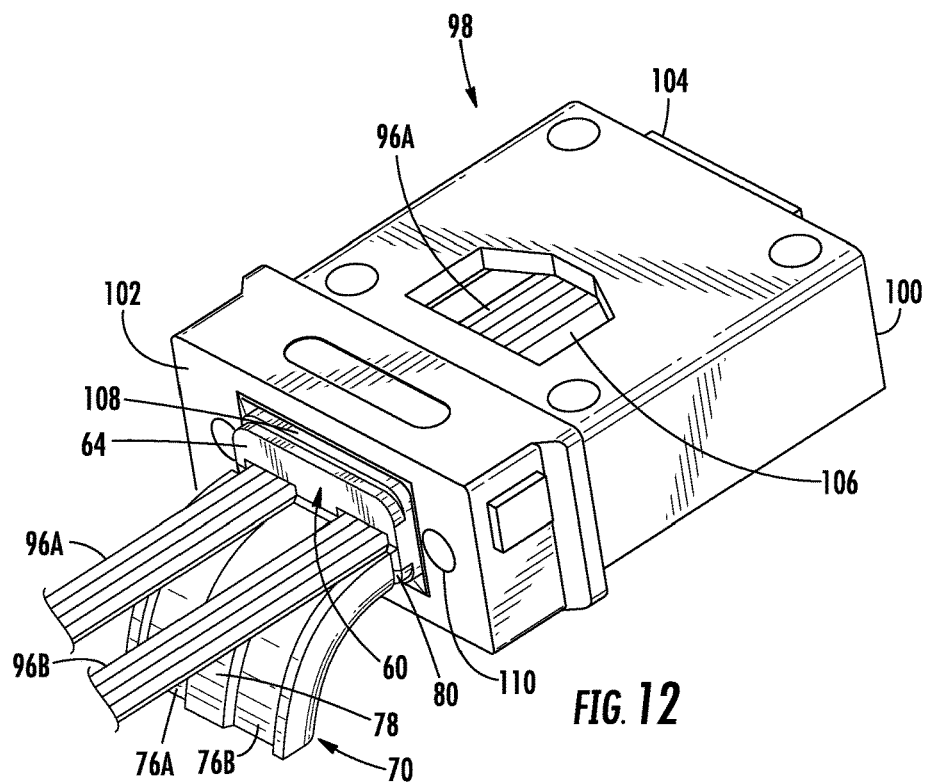
FIG. 12 is a perspective view of the ferrule boot, the first and second groups of loose optical fibers, and the multi-fiber ferrule of FIG. 11, showing downward deflection of the rear body portion in preparation for removal of the rear body portion from the front body portion.
Figure 13:
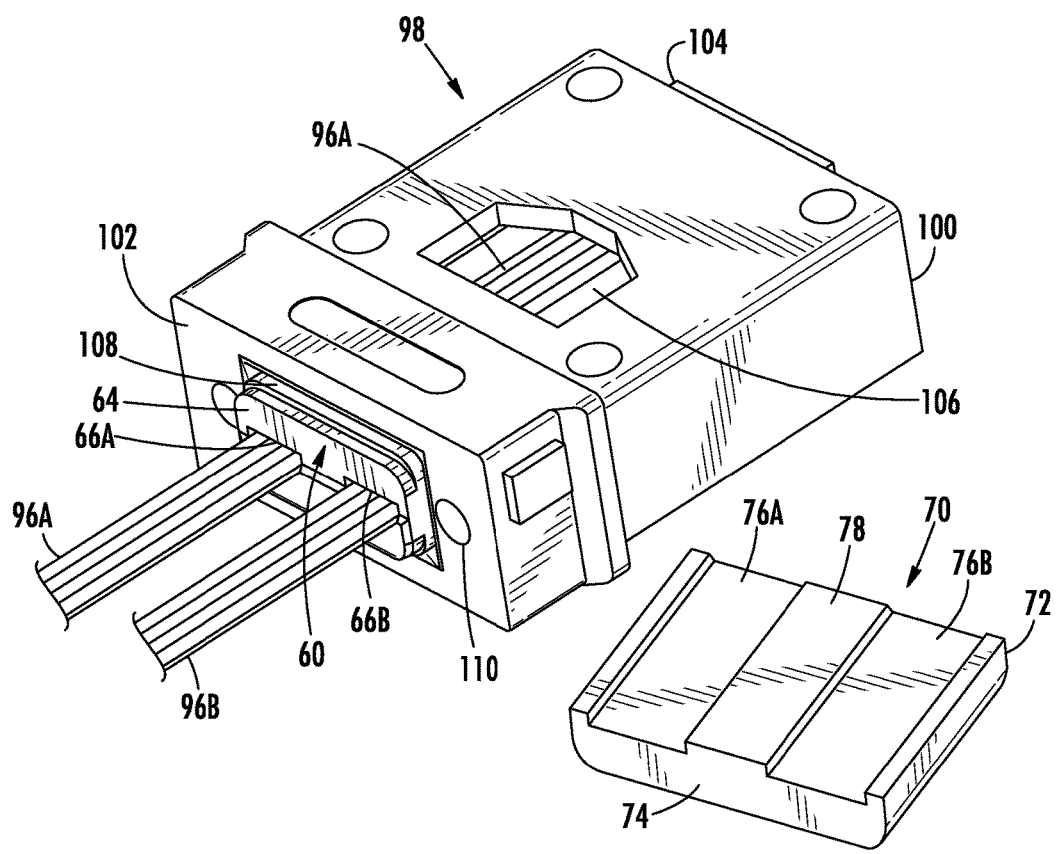
FIG. 13 is a perspective view of the ferrule boot, the first and second groups of loose optical fibers, and the multi-fiber ferrule of FIGS. 11 and 12, and showing the rear body portion separated from the front body portion of the ferrule boot.

FIGS. 12 and 13 illustrate steps in removing the rear body portion 70 from the front body portion 60 of the ferrule boot 58 of FIG. 8 while the ferrule boot 58 is received by the ferrule 98. FIG. 12 illustrates the ferrule boot 58, the first and second groups of loose optical fibers 96A, 96B, and the ferrule 98 of FIG. 11, showing downward deflection of the rear body portion 70 in preparation for removal of the rear body portion 70 from the front body portion 60 along the interface 80. Such deflection may be accomplished manually and/or aided by use of a tool. FIG. 13 shows the rear body portion 70 separated from the front body portion 60. In certain instances, it may be preferable to remove the rear body portion 70 prior to assembly of a connector incorporating the ferrule 98 in order to avoid imposition of asymmetric stress on the first and second groups of loose optical fibers 96A, 96B.

Figure 14:
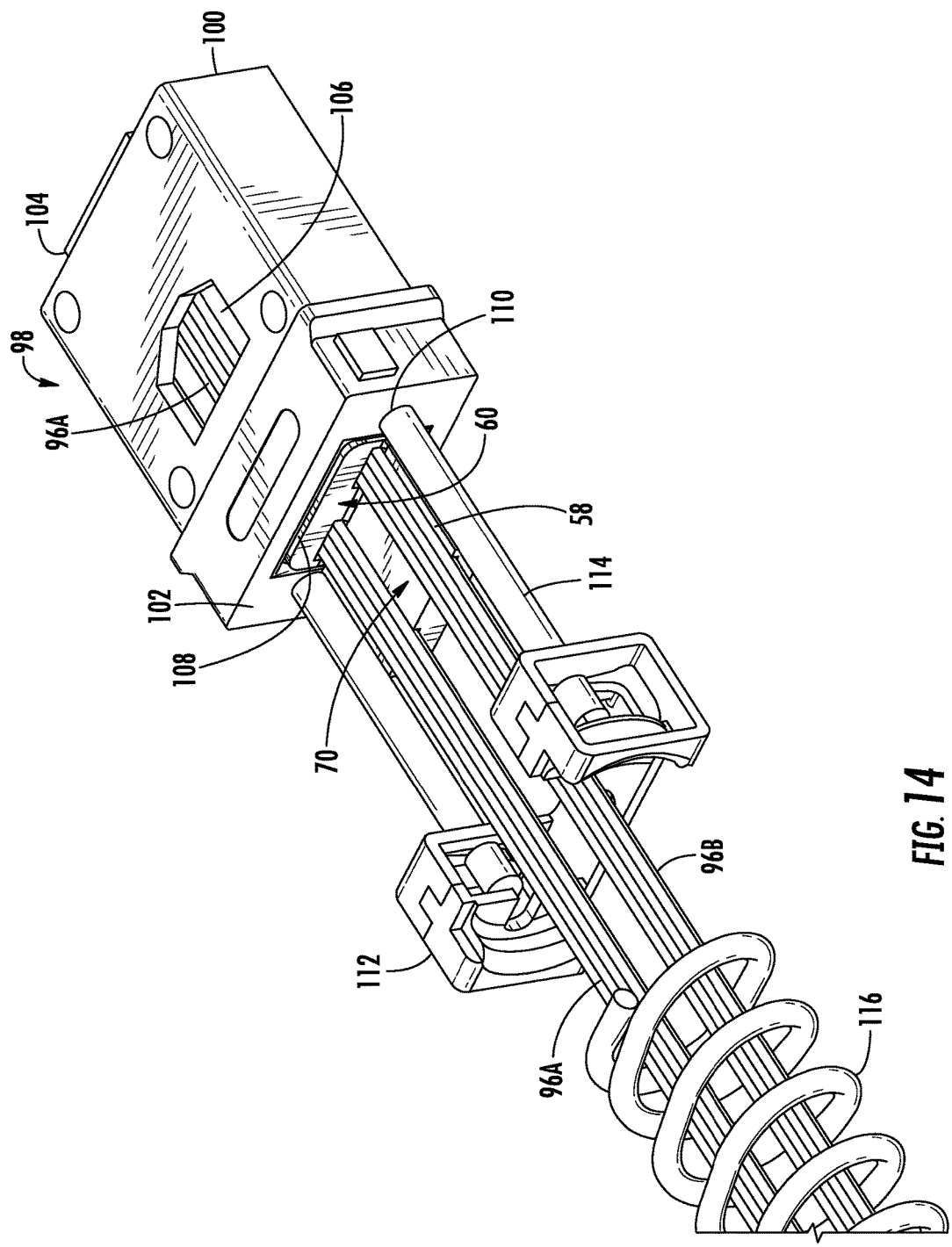
FIG. 14 is a perspective view of the first and second groups of loose optical fibers, the multi-fiber ferrule, and the ferrule boot of FIG. 13, with addition of a pin keeper and associated guide pins partially inserted into the multi-fiber ferrule, and with a coil spring positioned around the loose optical fibers behind the pin keeper.

FIG. 14 is a perspective view of the first and second groups of loose optical fibers 96A, 96B, the ferrule 98, and the ferrule boot 58 (including front and rear body portions 60, 70) of FIG. 11, with addition of a pin keeper 112, guide pins 114, and a coil spring 116. The guide pins 114 extend in a longitudinal direction along either side of the first and second groups of loose optical fibers 96A, 96B. Features on the pin keeper 112 cooperate with features on the guide pins 114 to retain portions of the guide pins 114 within the pin keeper 112. As shown in FIG. 14, forward portions of the guide pins 114 are inserted into the pin holes 110 extending between end faces 100, 102 the ferrule 98, and the coil spring 116 is positioned around the first and second groups of loose optical fibers 96A, 96B behind the pin keeper 112.

Figure 15:
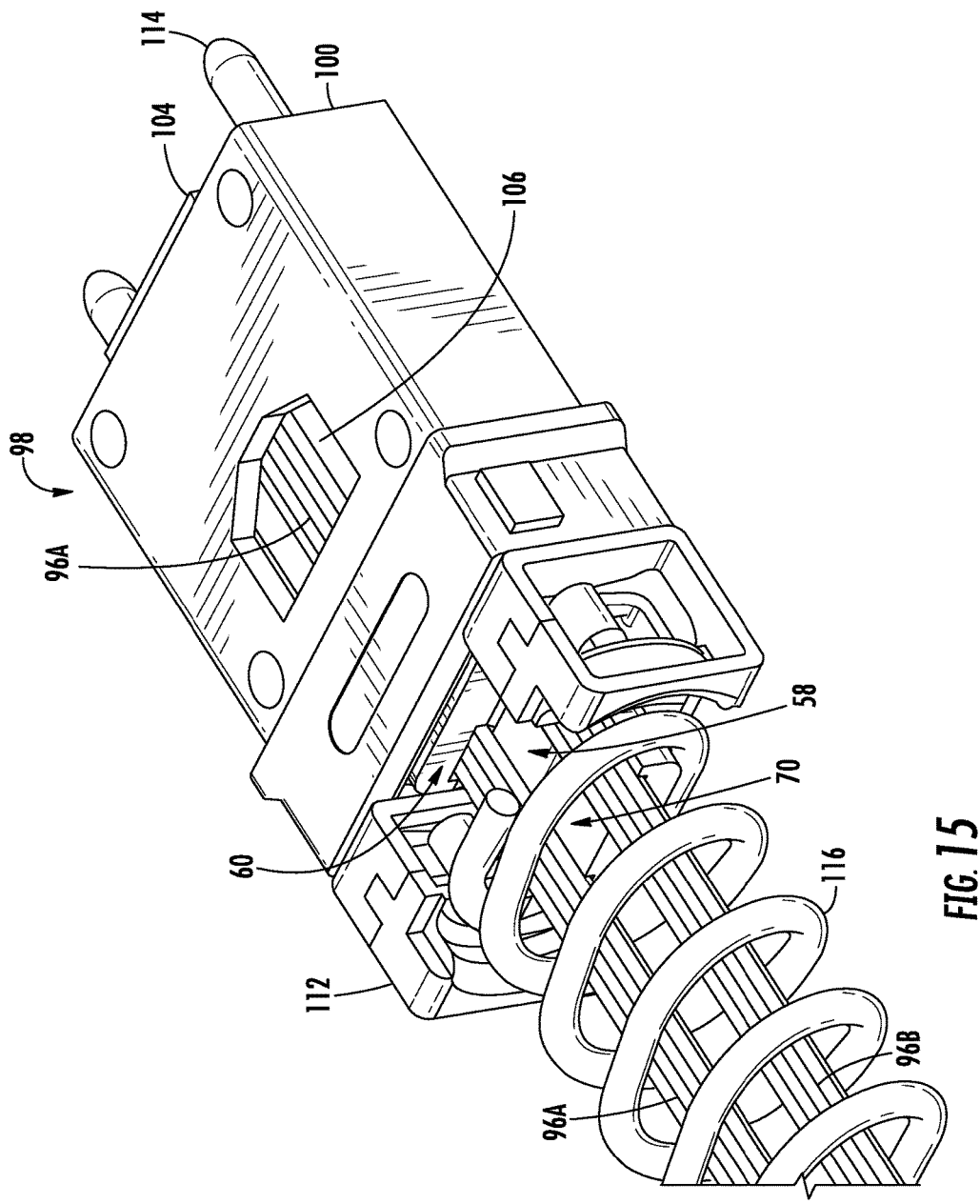
FIG. 15 is a perspective view of the elements of FIG. 14, with the guide pins inserted through the multi-fiber ferrule, with the pin keeper contacting a rear end face of the multi-fiber ferrule, and with the coil spring positioned to bias the pin keeper to a forward position.

FIG. 15 shows the guide pins 114 fully inserted through the ferrule 98 to project forward beyond the front end face 100. The pin keeper 112 and the guide pins 114 are biased to a forward position via the coil spring 116, with the pin keeper 112 contacting the rear end face of the ferrule 98. As depicted in FIG. 15, the rear body portion 70 projects rearward to extend into an interior of the coil spring 116 in contact with the pin keeper 112, such that the rear body portion 70 of the ferrule boot 58 may be retained within a fiber optic connector. Although not specifically illustrated, it is to be appreciated that additional components illustrated in FIGS. 1 and 2 may be arranged to cooperate with the elements shown in FIG. 15 to complete fabrication of a fiber optic connector. For example, in certain embodiments, a housing (e.g., the housing 18 shown in FIGS. 1 and 2) may be received over at least a portion of the ferrule 98, and the ferrule 98 may be spring biased within the housing 18 so that a front portion of the ferrule 98 extends beyond a front end of the housing 18.

Although the rear body portion 70 of the ferrule boot 58 depicted in various preceding figures was embodied in a ledge including guide channels 76A, 76B completely devoid of any top surface boundary, it is to be appreciated that ferrule boots according to other configurations may be provided. In certain embodiments, a ferrule boot may include a rear end face that generally opposes a front end face, but that is angled away from vertical (e.g., in a range of from about 20 degrees to about 70 degrees relative to a longitudinal axis) to define a portion of a guide channel that is devoid of a top surface boundary.

Figure 16:
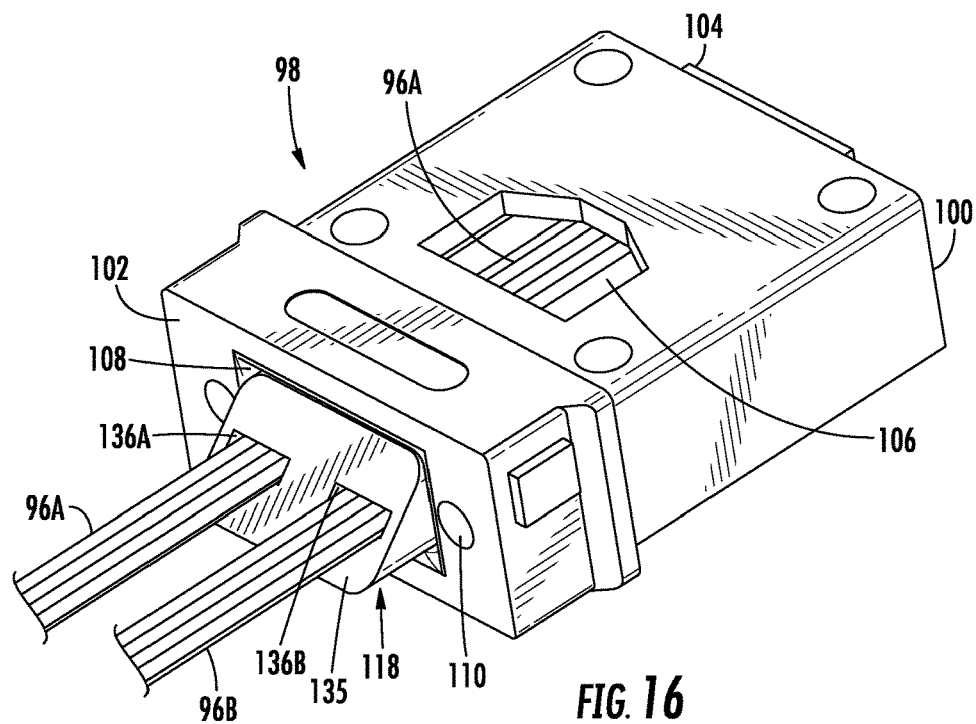
FIG. 16 is a perspective view of a multi-fiber ferrule into which an another exemplary ferrule boot is retained, with the ferrule boot including an angled rear end face defining guide channels through which first and second groups of loose optical fibers are inserted.

FIG. 16 is a perspective view of a multi-fiber ferrule 98 including a rear end face 102 defining a cavity 108 in which an alternative ferrule boot 118 is retained. The ferrule boot 118 includes an angled rear end face 135 defining guide channels 136A, 136B through which first and second groups of loose optical fibers 96A, 96B are inserted. Such groups of loose optical fibers 96A, 96B extend through the ferrule 98 (as shown in the window 106) to be received by micro-holes or bores (not shown) defined in the pedestal portion 104 of the front end face 100 of the ferrule 98. The ferrule 98 is identical to the ferrule 98 illustrated in FIGS. 11-15. Guide holes 110 are defined in peripheral portions of the ferrule 98 to receive spring-biased guide pins (such as the guide pins 114 shown in FIGS. 14 and 15).

Figure 17:
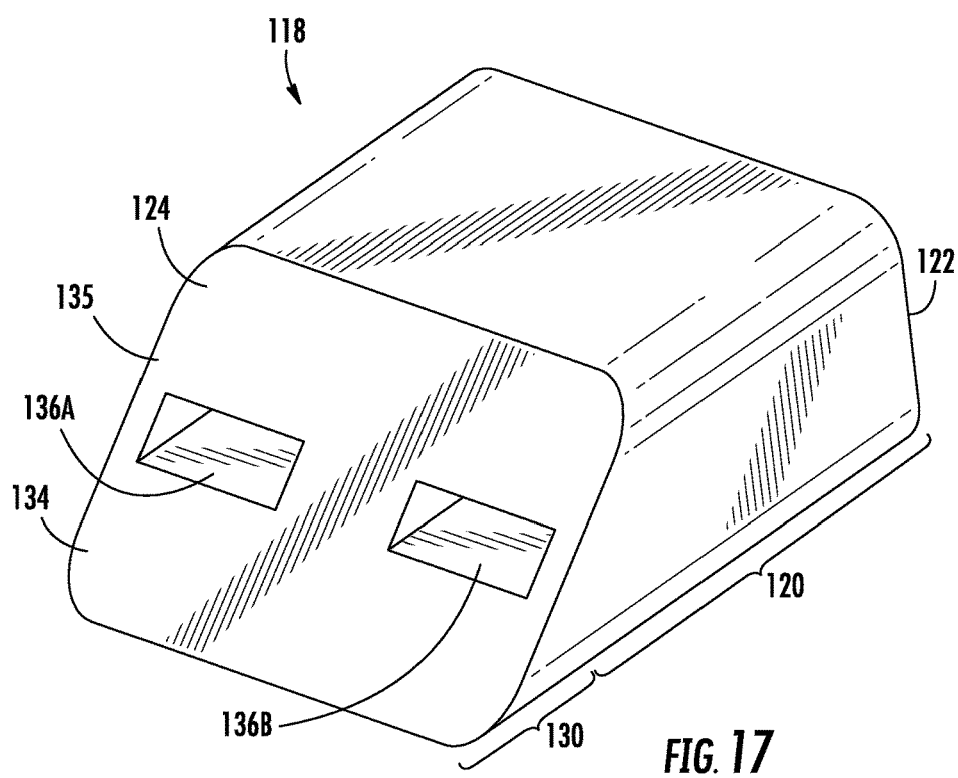
FIG. 17 is a perspective view of the ferrule boot of FIG. 16.
Figure 18:
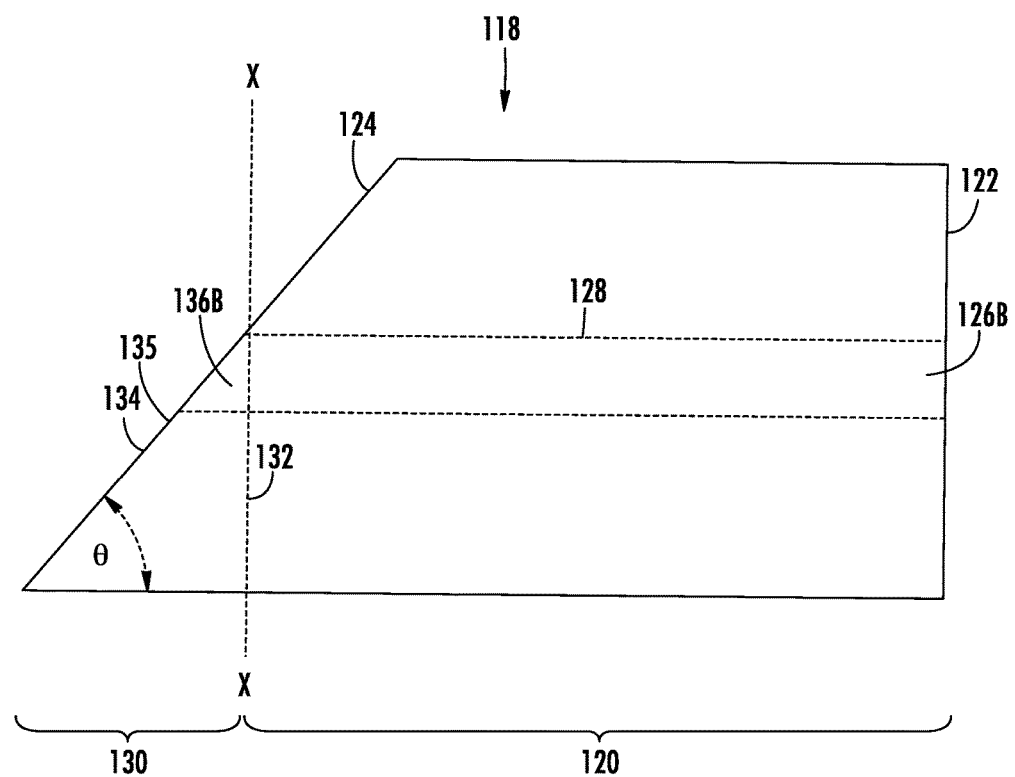
FIG. 18 is a side elevation schematic view of the ferrule boot of FIG. 17, depicting an aperture and a guide channel defined in a front body portion and a rear body portion, respectively, in broken lines.
Figure 19:
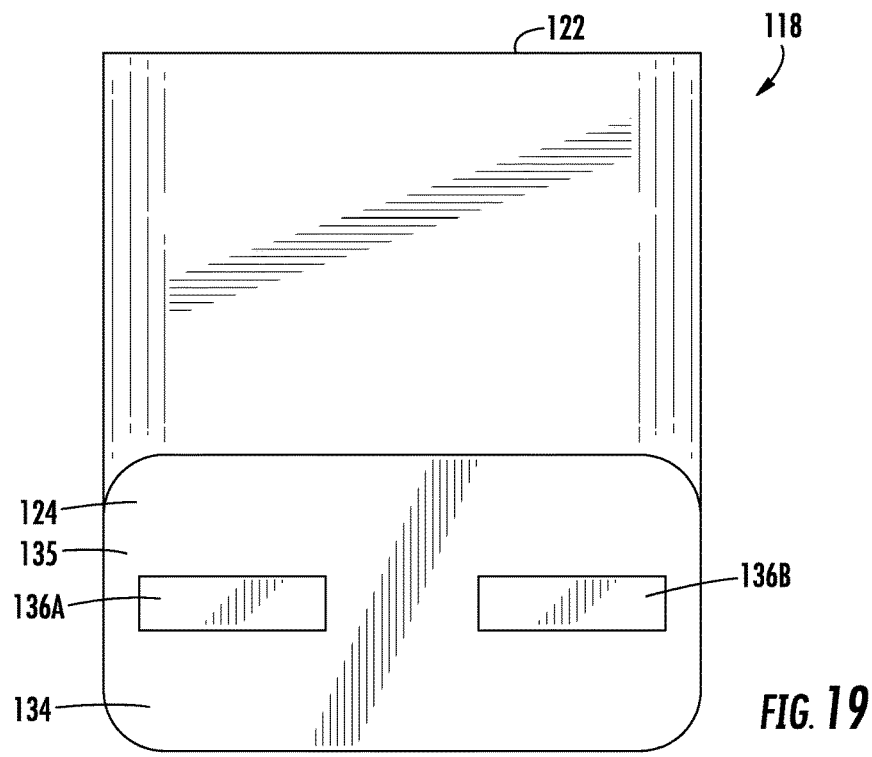
FIG. 19 is a top plan view of the ferrule boot of FIG. 17.

FIGS. 17-19 provide a perspective view, a side elevation schematic view, and a top plan view, respectively, of the ferrule boot 118 of FIG. 16. Referring to FIG. 17, the ferrule boot 118 includes a front body portion 120 and a rear body portion 130 that are substantially continuous, with guide channels 136A, 136B defined in the rear body portion 130. The guide channels 136A, 136B are registered with apertures (such as aperture 126B shown in FIG. 18) defined through the front body portion 120. Rear boundaries of the front body portion 120 and the rear body portion 130 may embody different parts of an angled rear end face 135 of the ferrule boot 118. Referring to FIG. 18, an imaginary vertical plane "X-X" may be defined through a rearmost edge of an uppermost boundary 128 of the apertures (e.g., aperture 126B) defined through the front body portion 120. This plane "X-X" defines a front end 132 of the rear body portion 130, and further represents a transition between each guide channel (e.g., guide channel 136B) and a corresponding aperture (e.g., aperture 126B). An upper part of the angled rear end face 135 forward of the imaginary vertical plane "X-X" embodies a rear end 124 of the front body portion 120, and a lower part of the angled rear end face 135 rearward of the imaginary vertical plane "X-X" embodies a rear end 134 of the rear body portion 130. The angled rear end face 135 is preferably angled away from vertical, preferably in a range of from about 20 degrees to about 70 degrees (or within subranges of from about 30 degrees to about 60 degrees, or from about 35 degrees to about 55 degrees) relative to a longitudinal axis, as represented by the angle θ shown in FIG. 18. A longitudinal axis through the ferrule boot 118 is parallel to the uppermost boundary 128 of the apertures 126B shown in FIG. 18. The angled rear end face 135, incorporating the rear end 124 of the front body portion 120 as well as the rear end 134 of the rear body portion 130, are further shown in FIGS. 17 and 19. Providing an angled rear end face 135 causes at least rearmost portions of the guide channels 136A, 136B to be devoid of a top surface boundary, thereby facilitating insertion of groups of loose optical fibers (not shown) into the guide channels 136A, 136B so as to permit the groups of loose optical fibers to be inserted through apertures to extend beyond a front end face 122 of the front body portion 120.

Figure 20:
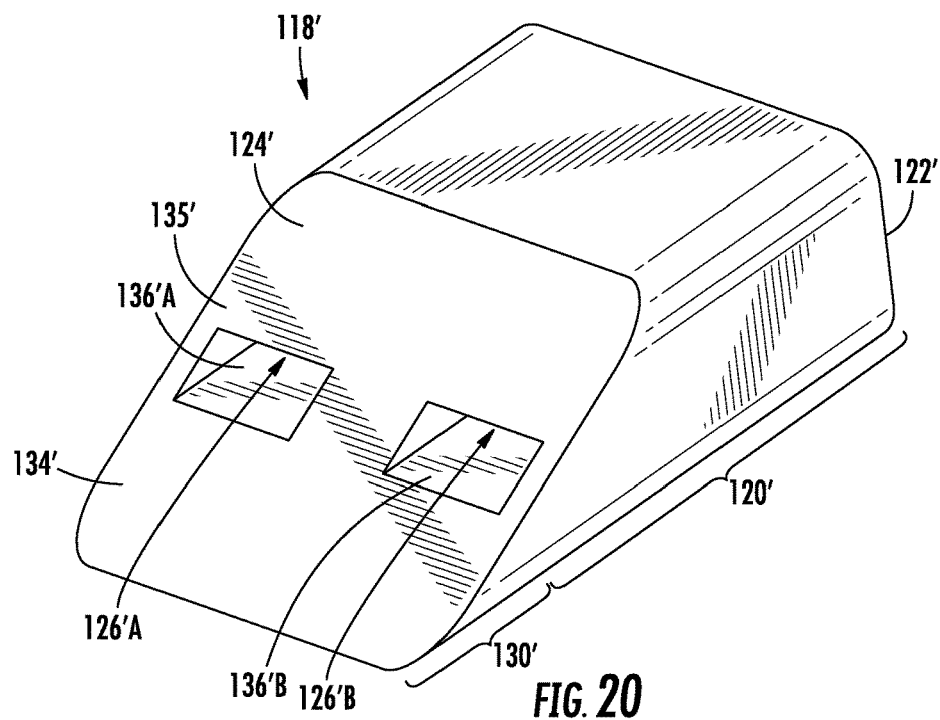
FIG. 20 is a perspective view of another exemplary ferrule boot including an angled rear end face defining guide channels for insertion of first and second groups of loose optical fibers, with the rear end face being angled differently from the ferrule boot of FIGS. 16 to 19.

FIG. 20 illustrates another ferrule boot 118' including an angled rear end face 135' defining guide channels 136'A, 136'B for insertion of first and second groups of loose optical fibers (not shown), with the angled rear end face 135' being angled differently from the angled rear end face 134 of the ferrule boot 118 of FIGS. 16-19. The ferrule boot 118' further includes a front body portion 120' arranged between a front end face 122' and a rear end 124', and includes a rear body portion 130' bounded in part by the rear end 134'. Provision of a more acute angle between an angled rear end face and a lower surface of a ferrule boot increases the amount of a guide channel that is devoid of a top surface boundary. Each guide channel 136'A, 136'B defined in the rear body portion 130' is registered with a corresponding aperture 126'A, 126'B defined in the front body portion 120', with each aperture 126'A, 126'B extending to the front end face 122' of the front body portion 120'.

Although FIGS. 16-20 each illustrate the presence of two guide channels that are horizontally aligned in a single row, it is to be appreciated that any desired number and configuration of guide channels (and corresponding apertures) may be defined in a ferrule boot. Exemplary ferrule boots including angled rear end faces with differing numbers and/or configurations of guide channels and apertures are shown in FIGS. 21-24.

Figure 21:
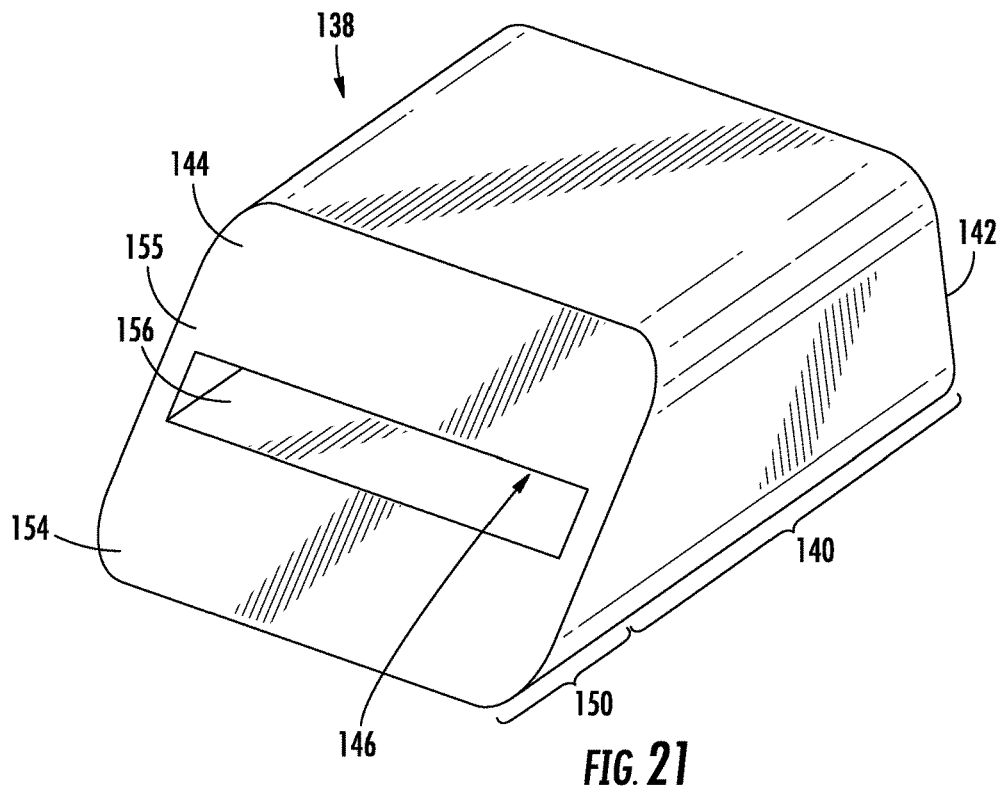
FIG. 21 is a perspective view of another exemplary ferrule boot including an angled rear end face defining a single wide guide channel through which at least one group of loose optical fibers may be inserted.

FIG. 21 illustrates a ferrule boot 138 including an angled rear end face 155 defining a single wide guide channel 156 through which at least one group of loose optical fibers may be inserted. The ferrule boot 138 further includes a front body portion 140 arranged between a front end face 142 and a rear end 144, and includes a rear body portion 150 bounded in part by a rear end 154. The single wide guide channel 156 is registered with a corresponding aperture 146 that extends through the ferrule boot 138 to the front end face 142.

Figure 22:
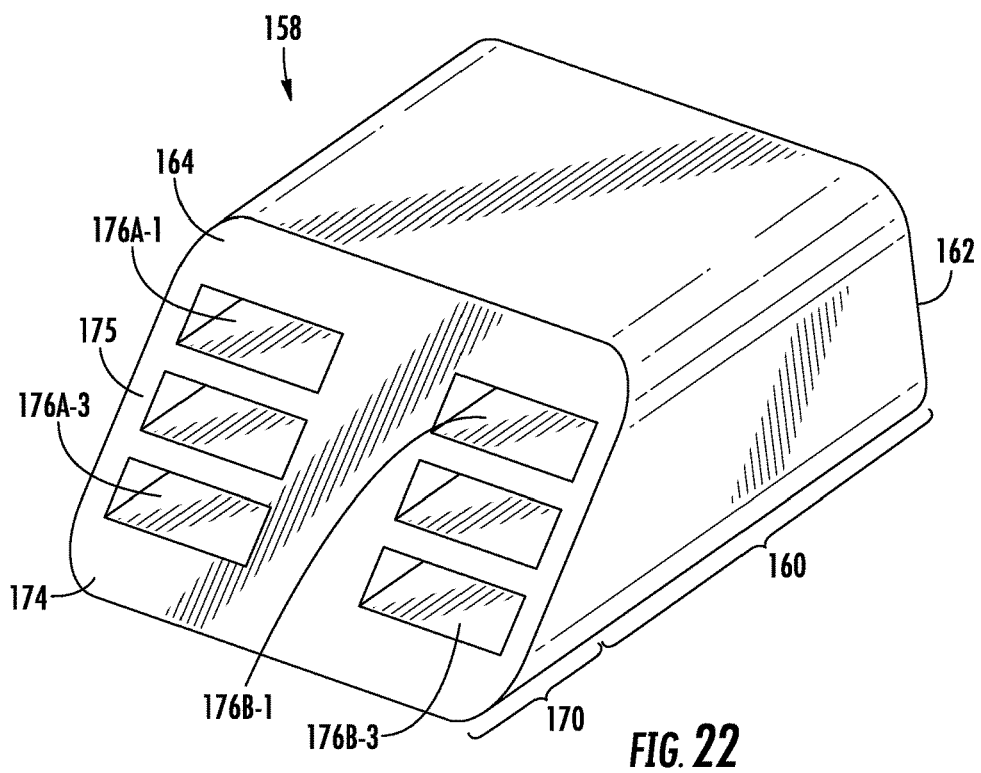
FIG. 22 is a perspective view of another exemplary ferrule boot including an angled rear end face defining six guide channels, arranged as two columns and three rows, through which six groups of loose optical fibers may be inserted.

FIG. 22 illustrates a ferrule boot 158 including an angled rear end face 175 defining six guide channels 176A-1 to 176A-3, 176B-1 to 176B-3, arranged as two columns and three rows, through which six groups of loose optical fibers may be inserted. The ferrule boot 158 further includes a front body portion 160 arranged between a front end face 162 and a rear end 164, and includes a rear body portion 170 bounded in part by a rear end 174. It is to be appreciated that each guide channel 176A-1 to 176A-3, 176B-1 to 176B-3 is registered with a corresponding aperture (not labeled) extending through the ferrule boot 158 to the front end face 162.

Figure 23:
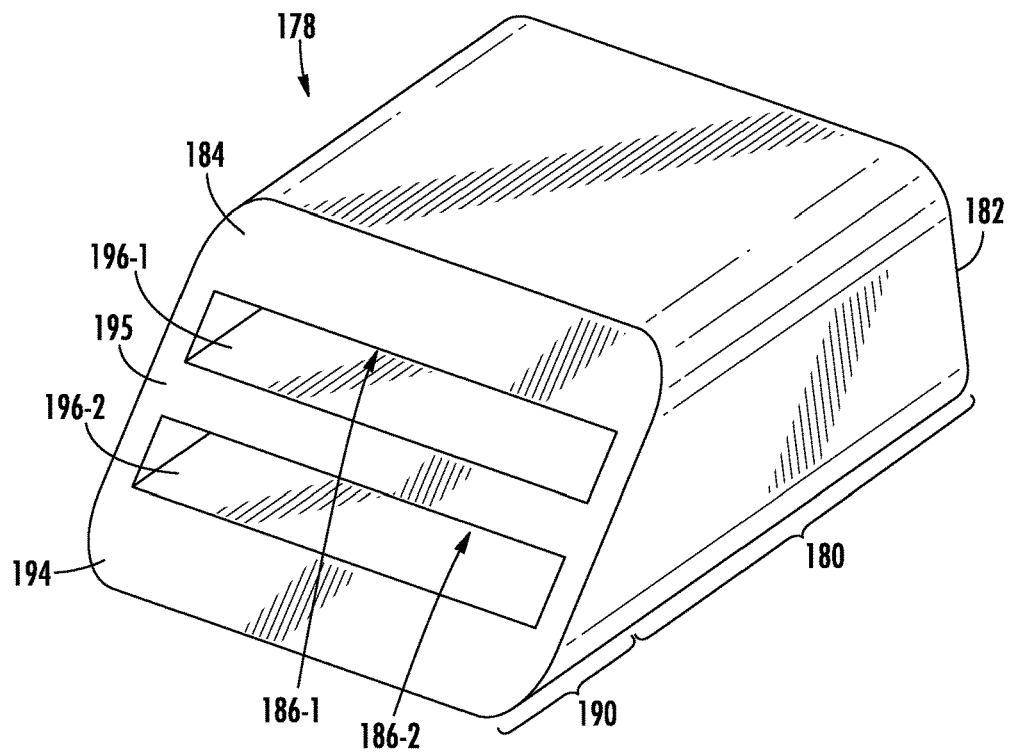
FIG. 23 is a perspective view of another exemplary ferrule boot including an angled rear end face defining two wide guide channels arranged in a stacked configuration and through which at least two groups of loose optical fibers may be inserted.

FIG. 23 is a perspective view of another ferrule boot 178 including an angled rear end face 195 defining two wide guide channels 196-1, 196-2 arranged in a stacked configuration and through which at least two groups of loose optical fibers may be inserted. The ferrule boot 178 further includes a front body portion 180 arranged between a front end face 182 and a rear end 184, and includes a rear body portion 190 bounded in part by a rear end 194. The guide channels 196-1, 196-2 are registered with corresponding apertures 186-1, 186-12 that extend through the ferrule boot 178 to the front end face 182.

Figure 24:
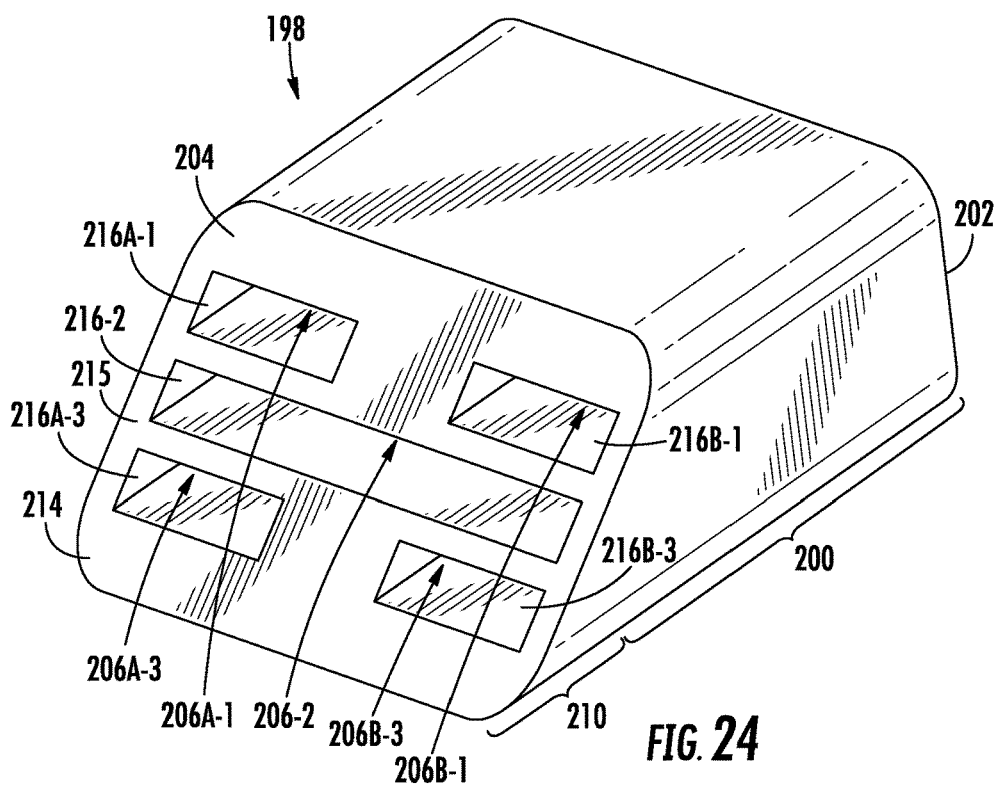
FIG. 24 is a perspective view of another exemplary ferrule boot including an angled rear end face defining a top row of two guide channels, a middle row of a single wide guide channel, and a bottom row of two guide channels, through which at least five groups of loose optical fibers may be inserted.

FIG. 24 illustrates another ferrule boot 198 including an angled rear end face 215 defining a top row of two guide channels 216A-1, 216B-1, a middle row of a single wide guide channel 216-2, and a bottom row of two guide channels 216A-3, 216B-3, arranged to receive at least five groups of loose optical fibers. The ferrule boot 198 further includes a front body portion 200 arranged between a front end face 202 and a rear end 204, and includes a rear body portion 210 bounded in part by a rear end 214. The guide channels 216A-1, 216B-1, 216-2, 216A-3, 216B-3 are registered with corresponding apertures 206A-1, 206B-1, 206-2, 206A-3, 206B-3 that extend through the ferrule boot 198 to the front end face 202.

In certain embodiments, a ferrule boot includes different guide channels arranged in detachable upper and lower parts, respectively, of a rear body portion. The upper part includes an upper tear-away feature, and the lower part includes a lower tear-away feature. The upper tear-away feature is positioned along an interface between the upper part and a front body portion, and the lower tear-away feature is positioned along an interface between the lower part and the front body portion. An exemplary ferrule boot 218 embodying such features is shown in FIGS. 25 and 26.

Figure 25:
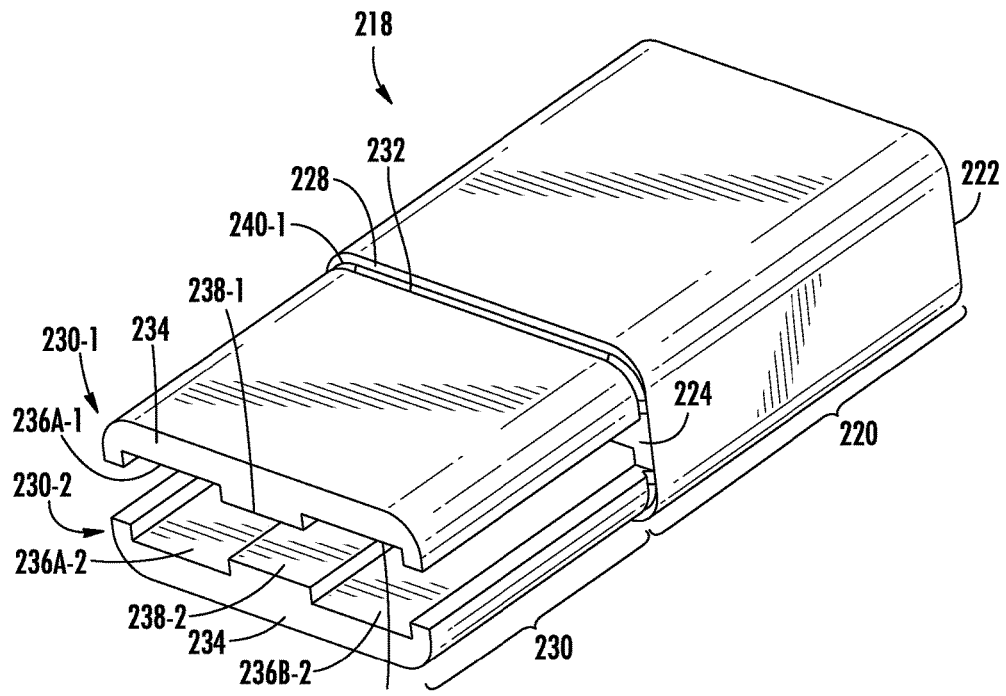
FIG. 25 is an upper perspective view of another exemplary ferrule boot including a front body portion defining multiple apertures, and including a rear body portion with a bottom guide ledge and a top guide ledge each including multiple guide channels registered with apertures defined in the front body portion.

Referring to FIG. 25, the ferrule boot 218 includes a front body portion 220 that defines multiple apertures (not shown) and includes a rear body portion 230 that includes an upper part 230-1 and a lower part 230-2 each extending between a front end 232 and a rear end 234 of the rear body portion 230. The front body portion 220 includes a front end face 222 and a rear end face 224, with apertures (not shown) extending therebetween. Each of the upper part 230-1 and the lower part 230-2 of the rear body portion 230 embodies a guide ledge and terminates at a rear end 234. The upper part 230-1 includes a front end 240-1 and defines two guide channels 236A-1, 236A-2 that are separated by an upper medial wall 238-1. The lower part 230-2 includes a front end 240-2 and defines two guide channels 236B-1, 236B-2 that are separated by a lower medial wall 238-2. Each guide channel 236A-1, 236A-2, 236B-1, 236B-2 is registered with a corresponding aperture (e.g., apertures 226A-2, 226B-2 shown in FIG. 26) to permit groups of loose optical fibers inserted into the respective guide channels 236A-1, 236A-2, 236B-1, 236B-2 of the rear body portion 230 to be guided into and through apertures in the front body portion 220. Tear-away features positioned along the interface 228 each have a reduced height and reduced width relative to a remainder of the upper part 230-1 and the lower part 230-2, and are provided between the front and rear body portions 220, 230, to permit the upper and lower parts 230-1, 230-2 to be removed from the front body portion 220 after fiber group insertion is complete.

Figure 26:
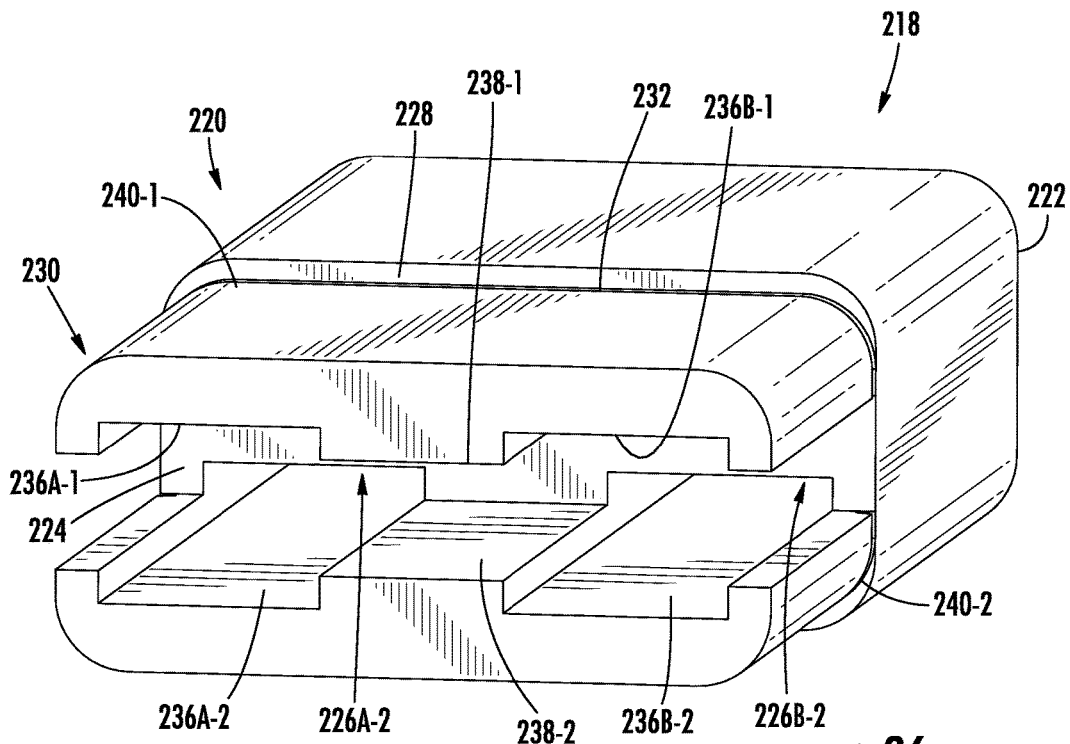
FIG. 26 is an end perspective view of the ferrule boot of FIG. 25.

Referring to FIG. 26, the lower guide channels 236A-2, 236B-2 defined in the rear body portion 230 are bounded by bottom walls and side walls that are registered with bottom walls and side walls, respectively, of corresponding apertures 226A-2, 226B-2 defined in the front body portion 220. Notably, each lower guide channel 236A-2, 236B-2 lacks a top surface boundary that is registered with a top surface of a corresponding aperture 226A-2, 226B-2. Rather, a top portion (e.g., between the upper and lower parts 230-1, 230-2 (shown in FIG. 25) of the rear body portion 230) of each lower guide channel 236A-2, 236B-2 is provided to ease reception of at least one group of optical fibers therein. The upper part 230-1 is arranged above, but is vertically offset relative to (and therefore not registered with), the lower guide channels 236A-2, 236B-2 and the corresponding apertures 226A-2, 226B-2. Following insertion of groups of loose optical fibers into the guide channels 236A-2, 236B-2, such groups of loose optical fibers may be inserted into and through the apertures 226A-2, 226B-2 defined in the front body portion 220, and the lower part of the rear body portion 230 may be removed by tearing along the interface 228 shown in FIG. 25. It is to be appreciated that the upper guide channels 236A-1, 236B-1 and corresponding apertures (not shown) defined in the front body portion 220 function in the same manner.

The various ferrule boots disclosed herein may be substituted for the ferrule boot 32 shown in FIG. 2.

Consistent with the foregoing disclosure, a method for fabricating fiber optic cable assembly may include multiple steps. An initial step includes assembling a plurality of loose optical fiber segments emanating from a fiber optic cable into at least one group of loose optical fibers. The loose optical fibers are preferably non-ribbonized. Subsequently, the at least one group of loose optical fibers is received into at least one guide channel defined in a rear body portion of a ferrule boot, with the at least one guide channel being bounded by side surfaces and a bottom surface. The at least one group of loose optical fibers is then inserted into and through at least one aperture defined through a front body portion of the ferrule boot. Each aperture of the at least one aperture is bounded by a bottom surface, a top surface, and side surfaces extending through the front body portion, and at least a portion of each guide channel of the at least one guide channel is devoid of a top surface boundary that is registered with a top surface of a corresponding aperture of the at least one aperture. Thus, an accessible (e.g., open) top portion is provided to ease insertion of at least one group of loose optical fibers into the at least one guide channel, and the at least one guide channel serves to guide insertion of the at least one group of loose optical fibers through the at least one aperture.

In certain embodiments, the rear body portion may be removed from the front body portion by tearing along at least one tear-away feature positioned along at least one interface between the respective body portions. In certain embodiments, the at least one group of loose optical fibers may be inserted through at least one group of bores defined in a ferrule, at least the front body portion of the ferrule boot may be received within a rear portion of the ferrule, and the at least one group of loose optical fibers may be secured (e.g., via a suitable adhesive such as an epoxy) to the ferrule proximate to the at least one group of bores. Various processing steps may be performed with respect to groups of optical fibers secured by a ferrule boot and/or a ferrule disclosed herein, such as: stripping end portions of the at least one group of loose optical fibers; cleaving the at least one group of loose optical fibers; and/or terminating the at least one group of loose optical fibers (e.g., proximate to a front end face of the ferrule). In certain embodiments, a housing may be received over at least a portion of the ferrule, and the ferrule may be spring biased within the housing so that a front portion of the ferrule extends beyond a front end of the housing.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A ferrule boot for use in fabricating a fiber optic cable assembly, the ferrule boot comprising:
 a front body portion;
 a rear body portion extending rearward from the front body portion and defining at least one guide channel; and
 at least one tear-away feature positioned along at least one interface between the front body portion and the rear body portion to facilitate removal of the rear body portion from the front body portion;
 wherein:
  at least one aperture is defined through the front body portion, with each aperture of the at least one aperture being bounded by a bottom surface, a top surface, and side surfaces extending through the front body portion;
  the at least one guide channel extends rearwardly from the at least one aperture;
  each guide channel of the at least one guide channel is bounded by side surfaces and a bottom surface that are respectively registered with side surfaces and the bottom surface of a corresponding aperture of the at least one aperture;

each guide channel of the at least one guide channel and each aperture of the at least one aperture are configured to receive multiple optical fibers; and at least a portion of each guide channel of the at least one guide channel is devoid of a top surface boundary that is registered with a top surface of a corresponding aperture of the at least one aperture.

2. The ferrule boot of claim 1, wherein the at least one aperture comprises a plurality of apertures, and the at least one guide channel comprises a plurality of guide channels.

3. The ferrule boot of claim 2, wherein the plurality of apertures comprises a first aperture that is laterally offset relative to a second aperture, and the plurality of guide channels comprises a first guide channel that is laterally offset relative to a second guide channel.

4. The ferrule boot of claim 2, wherein the plurality of apertures comprises a first aperture that is vertically offset relative to a second aperture, and the plurality of guide channels comprises a first guide channel that is vertically offset relative to a second guide channel.

5. The ferrule boot of claim 2, wherein the rear body portion comprises a ledge, and an entirety of each guide channel of the plurality of guide channels is devoid of a top surface boundary.

6. The ferrule boot of claim 1, wherein at least part of the rear body portion comprises a reduced height relative to the front body portion.

7. The ferrule boot of claim 1, wherein the side surfaces of each guide channel of the at least one guide channel comprise a reduced height relative to the side surfaces of each aperture of the at least one aperture.

8. The ferrule boot of claim 1, wherein:
the front body portion comprises a front end face;
the rear body portion comprises a rear end face that generally opposes the front end face;
the bottom surface of each guide channel of the at least one guide channel and the bottom surface of each aperture of the at least one aperture are arranged along a longitudinal axis extending through the ferrule boot; and
the rear end face is non-perpendicular to the longitudinal axis.

9. The ferrule boot of claim 8, wherein the rear end face is angled in a range of from about 20 degrees to about 70 degrees relative to the longitudinal axis.

10. The ferrule boot of claim 1, wherein the at least one tear-away feature comprises at least one of a reduced thickness region or a reduced width region positioned along the at least one interface between the front body portion and the rear body portion.

11. The ferrule boot of claim 1, wherein:
the rear body portion comprises an upper part and a lower part;
the at least one tear-away feature includes an upper tear-away feature and a lower tear-away feature;
the upper tear-away feature is positioned along an interface between the upper part and the front body portion; and
the lower tear-away feature is positioned along an interface between the lower part and the front body portion.

12. The ferrule boot of claim 1, further comprising a top surface boundary that is vertically offset relative to the at least one guide channel.

13. A fiber optic cable assembly comprising:
a fiber optic cable;
a ferrule comprising a front end face and defining at least one group of bores extending through the front end face;
at least one group of optical fibers emanating from the fiber optic cable and extending through the at least one group of bores, wherein ends of optical fibers of the at least one group of optical fibers are terminated proximate to the front end face, and the optical fibers of the at least one group of optical fibers are secured within the ferrule proximate to the at least one group of bores; and
a ferrule boot according to claim 1 received within a rear portion of the ferrule;
wherein the at least one group of optical fibers is non-ribbonized and extends through the at least one aperture in the ferrule boot.

14. The fiber optic cable assembly of claim 13, wherein:
the at least one group of bores comprises a plurality of groups of bores;
the at least one group of optical fibers comprises a plurality of groups of optical fibers;
the at least one aperture comprises a plurality of apertures; and
the at least one guide channel comprises a plurality of guide channels.

15. The fiber optic cable assembly of claim 13, further comprising a pin keeper, guide pins extending from the pin keeper through pin holes defined through the ferrule, and a coil spring configured to bias the pin keeper and the guide pins to a forward position, wherein a rear body portion of the ferrule projects rearward to extend into an interior of the coil spring.

16. A method for fabricating a fiber optic cable assembly, the method comprising:
assembling a plurality of loose optical fiber segments emanating from a fiber optic cable into at least one group of loose optical fibers;
receiving the at least one group of loose optical fibers into at least one guide channel defined by a rear body portion of a ferrule boot, with each guide channel of the at least one guide channel being bounded by side surfaces and a bottom surface; and
inserting the at least one group of loose optical fibers received by the at least one guide channel into and through at least one aperture defined through a front body portion of the ferrule boot;
wherein each aperture of the at least one aperture is bounded by a bottom surface, a top surface, and side surfaces extending through the front body portion; and
wherein at least a portion of each guide channel of the at least one guide channel is devoid of a top surface boundary that is registered with a top surface of a corresponding aperture of the at least one aperture;
the ferrule boot comprises at least one tear-away feature positioned along at least one interface between the front body portion and the rear body portion; and
following insertion of the at least one group of loose optical fibers through the at least one aperture, the method further comprises removing the rear body portion from the front body portion by tearing along the at least one tear-away feature.

17. The method of claim 16, wherein:
the at least one group of loose optical fibers comprises a plurality of groups of loose optical fibers;
the at least one aperture comprises a plurality of apertures; and the at least one guide channel comprises a plurality of guide channels.

18. The method of claim 16, further comprising:
following insertion of the at least one group of loose optical fibers through the at least one aperture, inserting the at least one group of loose optical fibers through at least one group of bores defined in a ferrule;
receiving at least a portion of the front body portion of the ferrule boot within a rear portion of the ferrule; and
adhesively securing the at least one group of loose optical fibers to the ferrule proximate to the at least one group of bores.

19. The method of claim 18, further comprising at least one of the following steps (i) to (iii):
   (i) stripping end portions of optical fibers of the at least one group of loose optical fibers extending beyond the at least one group of bores defined in the ferrule;
   (ii) cleaving end portions of optical fibers of the at least one group of loose optical fibers extending beyond the at least one group of bores defined in the ferrule; or
   (iii) terminating ends of optical fibers of the at least one group of loose optical fibers proximate to a front end face of the ferrule.

20. The method of claim 18, further comprising receiving a housing over at least a portion of the ferrule, and spring biasing the ferrule within the housing so that a front portion of the ferrule extends beyond a front end of the housing.

21. The method of claim 18, wherein the ferrule boot comprises a top surface boundary that is vertically offset relative to the at least one guide channel.

* * * * *